(12) United States Patent
Yuan et al.

(10) Patent No.: US 11,573,181 B2
(45) Date of Patent: Feb. 7, 2023

(54) ULTRASOUND-SWITCHABLE FLUORESCENCE IMAGING HAVING IMPROVED IMAGING SPEED

(71) Applicant: Board of Regents, The University of Texas System, Austin, TX (US)

(72) Inventors: Baohong Yuan, Arlington, TX (US); Tingfeng Yao, Arlington, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 1 day.

(21) Appl. No.: 17/286,126

(22) PCT Filed: Oct. 1, 2019

(86) PCT No.: PCT/US2019/054048
§ 371 (c)(1),
(2) Date: Apr. 16, 2021

(87) PCT Pub. No.: WO2020/081228
PCT Pub. Date: Apr. 23, 2020

(65) Prior Publication Data
US 2021/0356398 A1    Nov. 18, 2021

Related U.S. Application Data

(60) Provisional application No. 62/747,244, filed on Oct. 18, 2018.

(51) Int. Cl.
*G01N 21/64* (2006.01)

(52) U.S. Cl.
CPC ..... *G01N 21/6458* (2013.01); *G01N 21/6402* (2013.01); *G01N 21/6486* (2013.01);
(Continued)

(58) Field of Classification Search
CPC .......... G01N 21/6458; G01N 21/6402; G01N 21/6486; G01N 2021/6439;
(Continued)

(56) References Cited

U.S. PATENT DOCUMENTS 10,267,786 B2 * 4/2019 Yuan .................. A61K 41/0028
10,379,109 B2 * 8/2019 Yuan .................. A61K 49/0034
(Continued)

FOREIGN PATENT DOCUMENTS

WO    2017210520 A1    12/2017

OTHER PUBLICATIONS

International Search Report and Written Opinion corresponding to PCT/US2019/054048, dated Jan. 2, 2020, 7 pages.

*Primary Examiner* — David P Porta
*Assistant Examiner* — Meenakshi S Sahu
(74) *Attorney, Agent, or Firm* — Nexsen Pruet, PLLC

(57) ABSTRACT

A method of imaging described herein comprises (a) disposing ultrasound-switchable fluorophores within an environment; (b) exposing the environment to ultrasound to create a first activation region within the environment; (c) disposing the fluorophores within the first activation region to switch the fluorophores from an off state to an on state; (d) irradiating the environment to excite the fluorophores within the first activation region; (e) detecting photoluminescence from the excited fluorophores at a first optical spot on an exterior surface of the environment; (f) subsequently creating a second activation region within the environment; (g) switching fluorophores within the second activation region to an on state; (h) exciting the fluorophores in the on state within the second activation region; and (i) detecting photoluminescence from the excited fluorophores within the
(Continued)

second activation region at a second optical spot on the exterior surface, wherein the first and second optical spots are optically resolvable.

17 Claims, 12 Drawing Sheets

(52) U.S. Cl.
CPC ........... *G01N 2021/6439* (2013.01); *G01N 2201/06113* (2013.01)

(58) Field of Classification Search
CPC  G01N 2201/06113; G01N 21/64; A61B 5/00; A61K 49/22
See application file for complete search history.

(56) References Cited

U.S. PATENT DOCUMENTS

| | | |
|---|---|---|
| 2004/0267137 A1 | 12/2004 | Peszynski et al. |
| 2013/0034122 A1 | 2/2013 | Lewis et al. |
| 2015/0309014 A1 | 10/2015 | Yuan et al. |

* cited by examiner

ULTRASOUND-SWITCHABLE FLUORESCENCE IMAGING HAVING IMPROVED IMAGING SPEED

CROSS-REFERENCE TO RELATED APPLICATIONS

This application is a U.S. National Phase of PCT/US2019/054048, filed Oct. 1, 2019, which claims priority under 35 U.S.C. § 119(e) to U.S. Provisional Patent Application No. 62/747,244, filed Oct. 18, 2018, the entireties of which are incorporated by reference herein.

STATEMENT REGARDING FEDERALLY SPONSORED RESEARCH

This invention was made with government support under contract CPRIT RP170564 awarded by the Cancer Prevention Research Institute of Texas and under contract CBET-1253199 awarded by the National Science Foundation. The government has certain rights in the invention.

FIELD

The invention is generally related to fluorescence imaging, and, more specifically, to ultrasound-switchable fluorescence (USF) imaging of biological tissue.

BACKGROUND

Fluorescence imaging has been widely used in many biomedical applications. Such imaging provides high sensitivity and specificity, with the additional benefits of low cost, use of non-ionizing radiation, and the ability to use multicolor imaging. However, fluorescence imaging suffers from various limitations, including limitations caused by the high optical scattering of biological tissue. For example, fluorescence microscopy has high spatial resolution (sub-microns) but is limited in imaging depth (<1 mm). Fluorescence diffuse optical tomography can image tissue as deep as several centimeters but is limited by poor spatial resolution (a few millimeters).

To achieve high resolution fluorescence imaging in centimeter-deep tissue, various techniques based on ultrasound mediated fluorescence emission have been developed. In general, spatial resolution is improved in these approaches by confining the fluorescence emission to a relatively small volume, which is dependent on ultrasound frequency. However, because this limited volume (where the desired signal comes from) is relatively small compared to the total fluorophore distribution, detection sensitivity can be lower than ideally desired. Fluorophores (or contrast agents) with high fluorescence emission efficiency and/or imaging systems with high sensitivity are thus generally desired to compensate for the small emission volume. High detection specificity and reduced noise are also often desired or needed to differentiate signal photons from other background photons.

Previously, fiber optic bundles have been used to collect emitted fluorescence photons, and various improved ultrasound-switchable fluorophores/contrast agents have been developed to improve detection sensitivity. While these developments have improved the utility of ultrasound-based fluorescence imaging, many of these previously developed systems still suffer from low photon-collection efficiency. Moreover, many previous techniques suffer from slow imaging speed, which has previously been limited by the time required for cooling imaged tissue to minimize thermal diffusion effects between two adjacent locations in the scanning/imaging sequence.

Therefore, there is a need for improved methods and systems of ultrasound-based fluorescence imaging.

SUMMARY

In one aspect, methods of ultrasound-switchable fluorescence (USF) imaging are described herein which, in some embodiments, can provide one or more advantages compared to other methods of ultrasound-switchable fluorescence imaging. For example, in some instances, a method described can have faster imaging speed. In some instances, a method described herein can have achieve high detection specificity. In some cases, a method described herein can have high photon collection efficiency and reduced noise.

In some embodiments, a method of imaging described herein comprises (a) disposing a population of ultrasound-switchable fluorophores within an environment, the environment having an exterior surface and the population of ultrasound-switchable fluorophores having a switching threshold temperature; (b) exposing the environment to an ultrasound beam to create a first activation region within the environment, the first activation region having a temperature greater than or equal to the switching threshold temperature; (c) disposing the population of fluorophores within the first activation region to switch at least one fluorophore of the population from an off state to an on state; (d) exposing the environment to a beam of electromagnetic radiation, thereby exciting at least one fluorophore in the on state within the first activation region; (e) detecting a first photoluminescence signal emitted by the excited fluorophore at a first optical spot on the exterior surface of the environment, the first optical spot corresponding to the first activation region within the environment; (f) subsequently exposing the environment to the ultrasound beam to create a second activation region within the environment, the second activation region having a temperature greater than or equal to the switching threshold temperature; (g) disposing the population of fluorophores within the second activation region to switch at least one fluorophore of the population from an off state to an on state; (h) exposing the environment to a beam of electromagnetic radiation, thereby exciting at least one fluorophore in the on state within the second activation region; and (i) detecting a second photoluminescence signal emitted by the excited fluorophore within the second activation region at a second optical spot on the exterior surface of the environment, the second optical spot corresponding to the second activation region within the environment, wherein the first optical spot and the second optical spot are optically resolvable spatially on the exterior surface of the environment. Moreover, in some cases, the second activation region is created within the environment and the second photoluminescence signal is detected on the exterior surface before the first activation region has cooled below the switching threshold temperature, or before the first activation region has cooled below a temperature that is within 20° C., 15° C., or 10° C. of the switching threshold temperature.

Further, it is to be understood that methods described herein are not limited to producing and imaging from only two activation regions as described above. For example, in some embodiments, a method described herein comprises ($f_n$) subsequently and sequentially exposing the environment to the ultrasound beam to create n additional activation regions within the environment, the n additional activation regions having a temperature greater than or equal to the switching threshold temperature; ($g_n$) disposing the population of fluorophores within the n additional activation regions to switch at least one fluorophore of the population from an off state to an on state; ($h_n$) sequentially exposing the environment to a beam of electromagnetic radiation an additional n times, thereby sequentially exciting at least one fluorophore in the on state within the n additional activation regions; and ($i_n$) sequentially detecting n additional photoluminescence signals emitted by the excited fluorophore within the n additional activation regions at n additional optical spots on the exterior surface of the environment, the n additional optical spots corresponding, respectively and sequentially, to the n additional activation regions within the environment. In some such cases, n is an integer between 1 and 1000. Moreover, each subsequent optical spot is optically resolvable spatially on the exterior surface of the environment from the immediately preceding optical spot. It is further to be understood that such optical resolution of sequential spots can be achieved even when the sequential optical spots are generated on a timescale identified above for the first and second optical spots (that is, prior to tissue cooling of the immediately preceding optical spot). Additionally, in some embodiments, each subsequent optical spot imaged in a method described herein is optically resolvable spatially on the exterior surface from all other preceding optical spots, not merely from the immediately preceding optical spot.

Further, in some embodiments, the first photoluminescence signal and the second photoluminescence signal of a method described herein can be directly detected using a camera. In some instances, the camera is stationary relative to the exterior surface of the environment. Moreover, in some cases, the first photoluminescence signal and the second photoluminescence signal of a method described herein can be directly detected using a camera in the absence of optical fibers or without using optical fibers to collect photons of the photoluminescence signals. In addition, in some instances, the first optical spot and the second optical spot (or n optical spots) of a method described herein are simultaneously within the field of view of the camera used to detect the emission from the optical spots.

As described further hereinbelow, methods described above can, in some cases, provide improved imaging speed, accuracy, and/or resolution. It is also possible to improve imaging speed, accuracy, and/or resolution in other manners contemplated by the present disclosure.

In another aspect, for example, a method of imaging described herein comprises (a) disposing a population of ultrasound-switchable fluorophores within an environment, the environment having an exterior surface and the population of ultrasound-switchable fluorophores having a switching threshold temperature; (b) exposing the environment to a plurality of ultrasound beams simultaneously to create a plurality of first activation regions within the environment, the plurality of first activation regions having a temperature greater than or equal to the switching threshold temperature; (c) disposing the population of fluorophores within the plurality of first activation regions to switch a plurality of fluorophores of the population from an off state to an on state; (d) exposing the environment to a beam of electromagnetic radiation, thereby exciting the plurality of fluorophores in the on state within the plurality of first activation regions; and (e) detecting a plurality of first photoluminescence signals emitted by the plurality of excited fluorophores at a plurality of first optical spots on the exterior surface of the environment, the plurality of first optical spots corresponding to the plurality of first activation regions within the environment, wherein the plurality of first activation regions are formed simultaneously, and wherein the plurality of first optical spots are optically resolvable spatially from one another on the exterior surface of the environment. In some embodiments, the plurality of first activation regions are formed simultaneously using a single ultrasound transducer.

Moreover, in some cases, the plurality of first photoluminescence signals can be directly detected using a camera. In some instances, for example, the plurality of first photoluminescence signals are simultaneously within a single field of view of a single camera. Further, in some embodiments, the camera is stationary relative to the exterior surface of the imaged environment.

It is also to be understood that imaging approaches described herein can be combined with one another. For example, in some embodiments, a method described in the preceding paragraph can further comprise (f) subsequently exposing the environment to the plurality of ultrasound beams to create a plurality of second activation regions within the environment, the plurality of second activation regions having a temperature greater than or equal to the switching threshold temperature; (g) disposing the population of fluorophores within the plurality of second activation regions to switch a plurality of fluorophores of the population from an off state to an on state; (h) exposing the environment to a beam of electromagnetic radiation, thereby exciting the plurality of fluorophores in the on state within the plurality of second activation regions; and (i) detecting a plurality of second photoluminescence signals emitted by the plurality of excited fluorophores at a plurality of second optical spots on the exterior surface of the environment, the plurality of second optical spots corresponding to the plurality of second activation regions within the environment, wherein the plurality of second activation regions are formed simultaneously; wherein the plurality of second optical spots are optically resolvable spatially from one another on the exterior surface of the environment; and wherein the plurality of second optical spots are optically resolvable spatially from the plurality of first optical spots on the exterior surface of the environment. Moreover, in some cases, the plurality of second activation regions can be created within the environment and the plurality of second photoluminescence signals can be detected on the exterior surface before the plurality of first activation regions have cooled below the switching threshold temperature or before the plurality of first activation regions have cooled below a temperature that is within 20° C., 15° C., or 10° C. of the switching threshold temperature.

As described further herein, the imaged environment of a method described herein can be a biological compartment. In some instances, the environment is an in vitro environment or an in vivo environment, such as a tissue or organ of a living organism. The imaged environment of a method described herein can also be a biological phantom material or tissue-mimicking phantom material.

Additional features and embodiments are further described in the detailed description which follows.

BRIEF DESCRIPTION OF THE DRAWINGS

The invention will now be described by way of example, with reference to the accompanying figures, of which:

FIGS. 7(b1)-7(b3) are a top view (XY), front view (XZ) and right view (YZ) of the reconstructed 3D CT images, respectively;

FIG. 7(c1) is a 3D view of the co-registered image of the two modalities;

FIGS. 7(c2)-7(c4) are corresponding 2D cross-section images at X=5.49 mm, Y=5.23 mm and Z=6.50 mm, respectively of FIG. 7(c1);

FIGS. 9(b1)-9(b3) are a top view (XY), front view (XZ) and right view (YZ) of the reconstructed 3D CT images of CT contrast agent distribution, respectively;

FIG. 9(c1) is a 3D view of co-registered images of the USF contrast agent distribution of FIGS. 8(a1)-8(a3) and the CT contrast agent distribution of FIGS. 9(b1)-9(b3); and FIG. 9(c2)-9(c4) are corresponding 2D cross-section images at X=9.60 mm, Y=4.78 mm and Z=7.98 mm, respectively of FIG. 9(c1).

DETAILED DESCRIPTION

Figure 1:
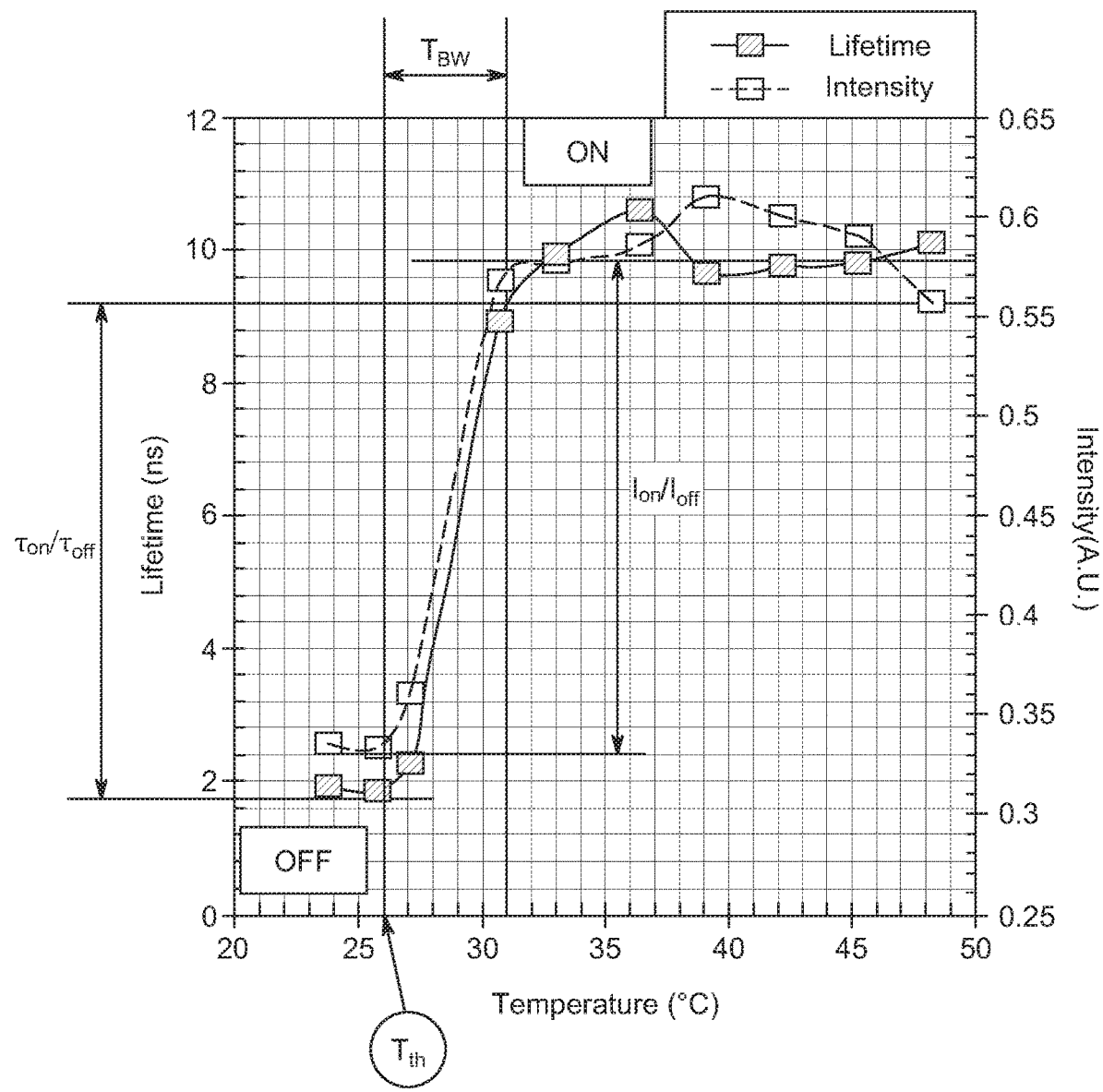
FIG. 1 is a plot of fluorescence intensity and fluorescence lifetime of a temperature-dependent fluorophore as a function of temperature.

Embodiments described herein can be understood more readily by reference to the following detailed description and examples. Elements, apparatus and methods described herein, however, are not limited to the specific embodiments presented in the detailed description and examples. It should be recognized that these embodiments are merely illustrative of the principles of this disclosure. Numerous modifications and adaptations will be readily apparent to those of skill in the art without departing from the spirit and scope of this disclosure.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10," "from 5 to 10," or "5-10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

In one aspect, methods of imaging are described herein. More particularly, methods of imaging using ultrasound-switchable fluorescence (USF) are described. Methods described herein can provide various advantages, as compared to other imaging methods, including other USF imaging methods.

In a typical USF imaging process, a population of ultrasound-switchable fluorophores are disposed in a desired imaging environment, such as within a biological compartment. The ultrasound-switchable fluorophores have a switching threshold between an off state and an on state. More specifically, an "ultrasound-switchable" fluorophore, for reference purposes herein, comprises a fluorophore operable to switch between an on state and an off state in response to exposure to an ultrasound beam (or more than one ultrasound beam). The ultrasound beam can be either directly or indirectly responsible for the switching response of the fluorophore. For example, in some cases, the ultrasound beam interacts directly with the fluorophore, resulting in a switch between fluorescence states of the fluorophore. In other cases, the ultrasound beam interacts directly with the immediate environment or microenvironment of the fluorophore and changes at least one property of the fluorophore's microenvironment. In such cases, the fluorophore can switch between on and off fluorescence states in response to the environmental change induced by the ultrasound beam. Thus, the fluorophore can be indirectly switchable in response to exposure to an ultrasound beam.

The "on" state of a fluorophore, for reference purposes herein, comprises either (1) a state at which the fluorescence intensity of the fluorophore is relatively high compared to the "off" state of the fluorophore, at which the fluorescence intensity is relatively low; or (2) a state at which the fluorescence lifetime of the fluorophore is relatively long compared to the "off" state of the fluorophore, at which the fluorescence lifetime is relatively short. Further, in both cases, the on and off states substantially define a step function in the fluorescence intensity or lifetime profile when plotted as a function of a critical switching parameter such as temperature or negative pressure. In some cases, the on state of a fluorophore exhibits at least about 70 percent, at least about 80 percent, or at least about 90 percent of the theoretical maximum fluorescence intensity of the fluorophore, and the off state of the fluorophore exhibits no more than about 50 percent, no more than about 30 percent, no more than about 10 percent, or no more than about 5 percent of the theoretical maximum fluorescence intensity of the fluorophore.

The physical cause for the existence of an on state versus an off state can vary. For example, in some cases, the fluorescence intensity or fluorescence lifetime of a fluorophore changes dues to a conformational or chemical change of the fluorophore in response to a change in environmental conditions, such as exhibited by some thermoresponsive polymers, pH-sensitive chemical species, or pressure sensitive materials. In some instances, the fluorescence intensity or fluorescence lifetime of a fluorophore changes in response to internal fluorescence quenching, wherein such quenching can be directly or indirectly induced by the presence of ultrasound.

For example, in an ultrasound-switched fluorescence process using a thermoresponsive fluorophore, a thermoresponsive polymer can be conjugated to a fluorescent species to provide a fluorophore. In an exemplary embodiment, the fluorophore has a chain conformation and a globular conformation, and the conformation is temperature-dependent. Further, the transition from one conformation to the other results in a change in the fluorescence intensity or lifetime of the fluorescent species. As understood by one of ordinary skill in the art, the change in fluorescence intensity or lifetime can be due to differences in the microenvironment of the fluorescent species when the polymer is in the chain conformation compared to the globular conformation. For example, in some cases, the polarity and/or viscosity of the polymer environment experienced by the fluorophore changes depending on whether the polymer is in the chain conformation or the globular conformation. Other exemplary ultrasound-switched processes are also known.

An ultrasound-switchable fluorophore can be described or characterized with reference to certain features relevant to USF imaging. Such features can be particularly relevant to the on and off states of the fluorophore. For example, in some cases, a fluorophore exhibits a certain on-to-off ratio in fluorescence intensity ($I_{On}/I_{Off}$), a certain on-to-off ratio in fluorescence lifetime ($\tau_{On}/\tau_{Off}$), a certain transition bandwidth between on and off states ($T_{BW}$), and/or a certain switching threshold ($S_{th}$), such as a certain switching threshold temperature ($T_{th}$) or a certain switching threshold pressure ($P_{th}$). These metrics can be further described with reference to FIG. 1.

FIG. 1 illustrates plots of the fluorescence intensity and fluorescence lifetime of a temperature-dependent fluorophore as a function of temperature. However, it is to be understood that the same principles and nomenclature can be applied in an analogous way for a fluorophore that exhibits pressure-dependent fluorescence, or fluorescence dependent on some other variable. In such an instance, the temperature axis of FIG. 1 could be replaced by a pressure axis or an axis corresponding to another variable related to fluorescence switching without otherwise substantially altering the appearance of FIG. 1. With reference to FIG. 1, $T_{th}$ refers to the switching threshold temperature. $I_{On}/I_{Off}$ refers to the ratio of the average fluorescence intensity of the fluorophore over a range of temperatures above the threshold temperature to the average fluorescence intensity of the fluorophore over a range of temperatures below the threshold temperature. Similarly, $\tau_{On}/\tau_{Off}$ refers to the ratio of the average fluorescence lifetime of the fluorophore over a range of temperatures above the threshold temperature to the average fluorescence lifetime of the fluorophore over a range of temperatures below the threshold temperature. In some embodiments, the averages are taken over a range of temperatures having a magnitude that is about 5 percent to about 100 percent of the magnitude of the switching threshold value but that lie outside of the transition bandwidth $T_{BW}$. $T_{BW}$ refers to the range of temperature values (or, analogously, pressure values or other variable values) over which the fluorophore switches from the on state to the off state in the manner of a step function. In other words, $T_{BW}$ refers to the width of the step between the on and off states. The smaller the $T_{BW}$, the more the fluorescence intensity profile of the fluorophore resembles a true step function having a discontinuity between the on state and the off state. In FIG. 1, the $I_{On}$ value is taken as the average intensity over a temperature range of about 33° C. to about 48° C. (a range of about 16° C., or about 62 percent of the $T_{th}$ value of 26° C.) and the $I_{Off}$ value is taken as the average intensity over a temperature range of about 23° C. to about 25° C. (a range of about 3° C., or about 12 percent of the $T_{th}$ value of 26° C.). In general, the range of temperature values used for determining the average fluorescence intensity in the on and off states can be based on the range of temperature values of interest for a particular imaging application.

Turning again to the USF imaging process itself, after a population of ultrasound-switchable fluorophores is disposed in a desired environment to be imaged, one or more ultrasound beams are directed to the environment, typically using one or more ultrasound transducers. The exposure of the environment to the ultrasound beam(s) creates or forms a so-called activation region within the environment. An "activation region," for reference purposes herein, comprises a region of the imaged environment in which ultrasound-switchable fluorophores can be switched from an off state to an on state. For example, in some cases, an activation region comprises a region of negative pressure compared to other portions of the environment. Similarly, in other instances, an activation region comprises a high temperature region. As described further herein, the temperature, pressure, or other characteristic of an activation region can be selected based on the switching threshold of a fluorophore disposed in the environment. For example, in some cases, one or more ultrasound beams are configured to form an activation region having an average temperature or a maximum temperature greater than a certain value, such as greater than a switching threshold temperature of the relevant fluorophore.

When an ultrasound-switchable fluorophore (or population of ultrasound-switchable fluorophores) enters or is disposed within an activation region, the fluorophore generally switches from an off state to an on state, as described above. While in the on state, the fluorophore can be excited to a luminescent state (e.g., by exposing the fluorophore to electromagnetic radiation having a suitable wavelength for photoexciting the fluorophore). Upon (radiative) relaxation of the excited state, luminescence emitted by the fluorophore (or population of fluorophores) exits the activation region. In a typical USF imaging process, at least some of the luminescent emission reaches the surface of the imaged environment (e.g., the exterior surface of the skin of an animal or human patient). The exiting luminescence thus creates, forms, or defines a photoluminescence signal. This photoluminescence signal, more particularly, can define or be described as an "optical spot" on the surface of the imaged environment. Each activation region thus corresponds to (or can be correlated or assigned to, or otherwise associated with) an optical spot, typically in a 1:1 manner. Such optical spots can have various sizes, but they are generally much smaller (in two dimensions) than the two-dimensional surface being imaged.

In some prior methods of performing USF imaging, imaging per se (actual generation of an output image, signal, or "map," or other similar data that can be associated with a spatial location of an imaged environment) is carried out as follows. An optical fiber or bundle of optical fibers is connected to a camera on one end, with the other end being available to receive a photoluminescent signal. The optical fiber or bundle is then used to receive photoluminescent signal from a single optical spot at a time. Thus, with an optical fiber or bundle detector, scanning is necessary to create a two-dimensional USF map of the imaged area, with each "scanning location" or "imaging location" generating one data point. Raster scanning is typically used with optical fibers/bundles, such that the optical fiber/bundle and ultrasound transducer are both moved during the imaging process (where the movement is relative to the imaged environment). The movement (and sequential activation) of the ultrasound transducer generates a series of activation regions within the volume of the imaged environment and a series of corresponding optical spots (or scanning locations) on the surface of the imaged environment. The paired movement of the optical fiber/bundle detector permits detection of the series of optical spots.

Unfortunately, prior methods of performing USF imaging with an optical fiber/bundle detector suffer from one or more disadvantages, such as low photon-collection efficiency and challenges associated with scanning or imaging an environment (such as a living animal or human) that has an uneven or non-planar surface. Moreover, using an optical fiber/bundle detector, imaging speed can be limited by the time required for cooling of the imaged environment (e.g., biological tissue). Without a cooling period, an activation region can remain warm enough to maintain ultrasound-switchable fluorophores in an on state or to heat an adjacent region of the environment by thermal diffusion, even after imaging of that activation region is complete. In this manner subsequent irradiation of a subsequently generated activation region can result in additional emission from the "still-hot" activation region or from another activation region not created by the focal zone of the ultrasound beam(s), leading to loss of imaging resolution and/or fidelity.

Methods disclosed herein, in contrast, can avoid or minimize one or more of the foregoing disadvantages. For example, in some cases, a method described herein provides more rapid scanning and imaging of an environment, as compared to previous methods of USF imaging. A method described herein, in some embodiments, is also more efficient in terms of photon-collection while avoiding challenges associated with scanning an uneven surface with an optical fiber/bundle detector.

In one aspect, a method of imaging described herein comprises (a) disposing a population of ultrasound-switchable fluorophores within an environment, the environment having an exterior surface and the population of ultrasound-switchable fluorophores having a switching threshold temperature; (b) exposing the environment to an ultrasound beam to create a first activation region within the environment, the first activation region having a temperature greater than or equal to the switching threshold temperature; (c) disposing the population of fluorophores within the first activation region to switch at least one fluorophore of the population from an off state to an on state; (d) exposing the environment to a beam of electromagnetic radiation, thereby exciting at least one fluorophore in the on state within the first activation region; (e) detecting a first photoluminescence signal emitted by the excited fluorophore at a first optical spot on the exterior surface of the environment, the first optical spot corresponding to the first activation region within the environment; (f) subsequently exposing the environment to the ultrasound beam to create a second activation region within the environment, the second activation region having a temperature greater than or equal to the switching threshold temperature; (g) disposing the population of fluorophores within the second activation region to switch at least one fluorophore of the population from an off state to an on state; (h) exposing the environment to a beam of electromagnetic radiation, thereby exciting at least one fluorophore in the on state within the second activation region; and (i) detecting a second photoluminescence signal emitted by the excited fluorophore within the second activation region at a second optical spot on the exterior surface of the environment, the second optical spot corresponding to the second activation region within the environment, wherein the first optical spot and the second optical spot are optically resolvable spatially on the exterior surface of the environment.

Moreover, in some embodiments, a second activation region is created within an environment and a second photoluminescence signal is detected on an exterior surface before a first activation region has cooled below a switching threshold temperature. However, in some instances, a second activation region is created within an environment and a second photoluminescence signal is detected on an exterior surface before a first activation region has cooled below a temperature that may not be the same as the switching threshold, such as a temperature that is within 20° C., 15° C., or 10° C. of the switching threshold temperature.

As understood by one of ordinary skill in the art, and as described above, when the first activation region (or a portion thereof) is still "hot" (i.e., at or above the switching threshold temperature of the ultrasound-switchable fluorophore), then fluorophores located within the first activation region can still be in an "on" state. Such fluorophores can thus be excited by the beam of electromagnetic radiation (or a subsequently applied beam of electromagnetic radiation). In turn, such excited fluorophores can emit a photoluminescence signal from within the first activation region. The emitted photoluminescence (from the first activation region) can thus be confused with or unresolved from emitted photoluminescence from a subsequently created activation region (such as the second activation region). In this way, a "false positive" for the second activation region can be generated, or simple loss of imaging resolution can occur.

It is also possible for a "hot" activation region (or portion thereof) to heat an adjacent region of the environment by thermal diffusion, even after imaging of that activation region is complete. In this manner subsequent irradiation of a subsequently generated activation region can result in additional emission from the "still-hot" activation region or from another (possibly unintended) activation region not created by the focal zone of the ultrasound beam(s). Again, loss of imaging resolution and/or fidelity can result from such thermal diffusion.

However, as described in the present disclosure, it is nevertheless possible to avoid such undesired effects, even when previously created activation regions are still "hot." In general, a method described herein, in some embodiments, comprises detecting a photoluminescence signal from a second (or (n+1)th) optical spot within a time period (following detection of the first (or nth) optical spot) that is shorter than the cooling off time of the first (or nth) optical spot. Yet such a method does not result in a lack of resolution of the first and second (or nth and (n+1)th) optical spots. Because the first (nth) optical spot and the second ((n+1)th) optical spot are optically resolvable (spatially) on the exterior surface of the imaged environment, the rapid detection of luminescence from multiple, sequential optical spots (or scanning locations) does not result in loss of information or "bleed" or overlap of sequentially detected optical/photoluminescence signals, even when optical spots are created and detected within timescales that are shorter than the time scale needed for cooling of previously imaged tissue.

It is to be understood that such optical resolvability can be achieved when immediately sequential (in time) scanning locations/optical spots (e.g., an nth scanning location/optical spot and an (n+1)th scanning location/optical spot) are far enough away from one another (spatially) for no "thermal contamination" between the locations/spots to occur. For reference purposes here, such lack of thermal contamination means that any thermal diffusion between the locations/spots changes the temperature of the later imaged location/spot by less than 3° C., less than 2° C., less than 1° C., or less than 0.5° C. during the time period between detecting the photoluminescence signal from the earlier imaged location/spot and detecting the photoluminescence signal from the immediately sequential scanning location/spot. It is further to be understood that the precise "minimum" spatial separation or distance between locations/spots can vary based on the thermal conductivity of the environment, the switching threshold temperature, the thickness of the environment being scanned, and the power of the ultrasound beam(s) used. As described further herein, many specific "patterns" of scanning can achieve such a desired result/optical resolution. For example, as described further hereinbelow, in some cases, sequential activation regions/scanning locations/optical spots are formed in a repeating "Z" pattern, as shown for instance in FIGS. 3A and 3B. Methods described herein are not limited to such a Z-shaped pattern, however. In some cases, other patterns, such as D-shaped, O-shaped, W-shaped, C-shaped, and so on can be used, so long as the sequential scanning location/optical spots are far enough away (spatially) for no "thermal contamination" between the locations/spots to occur.

Moreover, it is to be understood that the foregoing process involving two sequentially imaged optical spots or scanning locations can generally be extended to any number of sequential optical spots or scanning locations. That is, in some embodiments, a method described herein comprises repeating steps (b) through (i) above (or steps (f) through (i) above) any desired number of times.

For example, in some embodiments, a method described herein comprises (a) disposing a population of ultrasound-switchable fluorophores within an environment, the environment having an exterior surface and the population of ultrasound-switchable fluorophores having a switching threshold temperature; (b) exposing the environment to an ultrasound beam to create a first activation region within the environment, the first activation region having a temperature greater than or equal to the switching threshold temperature; (c) disposing the population of fluorophores within the first activation region to switch at least one fluorophore of the population from an off state to an on state; (d) exposing the environment to a beam of electromagnetic radiation, thereby exciting at least one fluorophore in the on state within the first activation region; (e) detecting a first photoluminescence signal emitted by the excited fluorophore at a first optical spot on the exterior surface of the environment, the first optical spot corresponding to the first activation region within the environment; (f) subsequently exposing the environment to the ultrasound beam to create a second activation region within the environment, the second activation region having a temperature greater than or equal to the switching threshold temperature; (g) disposing the population of fluorophores within the second activation region to switch at least one fluorophore of the population from an off state to an on state; (h) exposing the environment to a beam of electromagnetic radiation, thereby exciting at least one fluorophore in the on state within the second activation region; (i) detecting a second photoluminescence signal emitted by the excited fluorophore within the second activation region at a second optical spot on the exterior surface of the environment, the second optical spot corresponding to the second activation region within the environment, (j) subsequently exposing the environment to the ultrasound beam to create a third activation region within the environment, the third activation region having a temperature greater than or equal to the switching threshold temperature; (k) disposing the population of fluorophores within the third activation region to switch at least one fluorophore of the population from an off state to an on state; (l) exposing the environment to a beam of electromagnetic radiation, thereby exciting at least one fluorophore in the on state within the third activation region; and (m) detecting a third photoluminescence signal emitted by the excited fluorophore within the third activation region at a third optical spot on the exterior surface of the environment, the third optical spot corresponding to the third activation region within the environment, wherein the first optical spot and the second optical spot are optically resolvable spatially on the exterior surface of the environment, and wherein second optical spot and the third optical spot are optically resolvable spatially on the exterior surface of the environment.

More generally, methods are described herein comprising (a) disposing a population of ultrasound-switchable fluorophores within an environment, the environment having an exterior surface and the population of ultrasound-switchable fluorophores having a switching threshold temperature; (b) exposing the environment to an ultrasound beam to create a first activation region within the environment, the first activation region having a temperature greater than or equal to the switching threshold temperature; (c) disposing the population of fluorophores within the first activation region to switch at least one fluorophore of the population from an off state to an on state; (d) exposing the environment to a beam of electromagnetic radiation, thereby exciting at least one fluorophore in the on state within the first activation region; (e) detecting a first photoluminescence signal emitted by the excited fluorophore at a first optical spot on the exterior surface of the environment, the first optical spot corresponding to the first activation region within the environment; (f) subsequently exposing the environment to the ultrasound beam to create a second activation region within the environment, the second activation region having a temperature greater than or equal to the switching threshold temperature; (g) disposing the population of fluorophores within the second activation region to switch at least one fluorophore of the population from an off state to an on state; (h) exposing the environment to a beam of electromagnetic radiation, thereby exciting at least one fluorophore in the on state within the second activation region; (i) detecting a second photoluminescence signal emitted by the excited fluorophore within the second activation region at a second optical spot on the exterior surface of the environment, the second optical spot corresponding to the second activation region within the environment, ($f_n$) subsequently and sequentially exposing the environment to the ultrasound beam to create n additional activation regions within the environment, the n additional activation regions having a temperature greater than or equal to the switching threshold temperature; ($g_n$) disposing the population of fluorophores within the n additional activation regions to switch at least one fluorophore of the population from an off state to an on state; ($h_n$) sequentially exposing the environment to a beam of electromagnetic radiation an additional n times, thereby sequentially exciting at least one fluorophore in the on state within the n additional activation regions; and ($i_n$) sequentially detecting n additional photoluminescence signals emitted by the excited fluorophore within the n additional activation regions at n additional optical spots on the exterior surface of the environment, the n additional optical spots corresponding, respectively and sequentially, to the n additional activation regions within the environment, wherein n is any desired integer, such as an integer between 1 and 1000, and wherein each subsequent optical spot is optically resolvable spatially on the exterior surface of the environment from the immediately preceding optical spot. Moreover, in some cases, each subsequent optical spot is optically resolvable spatially on the exterior surface of the environment from all other preceding optical spots.

Additionally, in some embodiments, all of the detected photoluminescence signals detected during an imaging process described herein are detected using a camera. In particular, in some cases, the sequentially detected photoluminescence signals are detected using a camera directly, as opposed to indirect detection using a camera that is coupled to one or more optical fibers (e.g., a plurality of optical fiber collectors that are spatially positioned near, above, or otherwise distributed around the exterior surface of the imaged environment). That is, unlike some previous methods in which emitted photons of optical spots or scanning locations are first collected by optical fiber and then routed or "piped" by the optical fiber to a camera, methods of imaging described herein can be carried out without the use of optical fiber collectors. Instead, photoluminescence signals from one or more scanning locations/optical spots (or, preferably, all of the scanning locations/optical spots) can be collected and recorded directly by a camera, such as a charge coupled device (CCD) camera. In some such embodiments, the camera has a relatively large field of view (e.g., 10 cm×10 cm) that does not change during the imaging process. For example, the camera can be stationary relative to the imaged surface. The camera thus "sees" all of the scanning locations/optical spots at all times during the imaging method (that is, all of the scanning locations/optical spots of the method are within the field of view of the camera throughout the imaging process). Thus, in some cases, the camera is stationary relative to the exterior surface of the environment.

For example, in some embodiments, a first photoluminescence signal and a second photoluminescence signal of a method described herein are directly detected using a camera. In some cases, a first optical spot and a second optical spot are simultaneously within the field of view of a camera. Moreover, where relevant, n additional optical spots can be simultaneously within the field of view of a camera.

The use of a camera as described herein can avoid the need to move or "scan" the detector. More particularly, in some embodiments described herein, sequentially formed activation regions are created by moving or scanning an ultrasound beam source, such as an ultrasound transducer, without also moving or scanning the detector in a corresponding manner. Such lack of mechanical movement of the detector, in some instances, can permits faster USF imaging, as described herein.

In addition to the foregoing method of imaging, whereby improved USF imaging speeds can be obtained, the present disclosure further contemplates another method of improving USF imaging speeds. Specifically, in some embodiments, a method of imaging described herein comprises simultaneously forming a plurality of ultrasound focal volumes and a corresponding plurality of activation regions within an imaged environment. In some such cases, a method of imaging comprises (a) disposing a population of ultrasound-switchable fluorophores within an environment, the environment having an exterior surface and the population of ultrasound-switchable fluorophores having a switching threshold temperature; (b) exposing the environment to a plurality of ultrasound beams simultaneously to create a plurality of first activation regions within the environment, the plurality of first activation regions having a temperature greater than or equal to the switching threshold temperature; (c) disposing the population of fluorophores within the plurality of first activation regions to switch a plurality of fluorophores of the population from an off state to an on state; (d) exposing the environment to a beam of electromagnetic radiation, thereby exciting the plurality of fluorophores in the on state within the plurality of first activation regions; and (e) detecting a plurality of first photoluminescence signals emitted by the plurality of excited fluorophores at a plurality of first optical spots on the exterior surface of the environment, the plurality of first optical spots corresponding to the plurality of first activation regions within the environment, wherein the plurality of first activation regions are formed simultaneously, and wherein the plurality of first optical spots are optically resolvable spatially from one another on the exterior surface of the environment.

It is to be understood that such spatial resolution can be achieved or defined in the same manner as previously described above. Moreover, it is to be understood that, in some cases the plurality of first activation regions can be formed simultaneously using a single ultrasound transducer. Such a transducer can provide multiple ultrasound beams having multiple, differing ultrasound focal volumes.

Alternatively, in other instances, the plurality of first activation regions can be formed simultaneously or substantially simultaneously using a plurality of ultrasound transducers. Moreover, activation regions that are formed "substantially" simultaneously can each be formed within 1 second, within 0.5 seconds, or within 0.1 seconds of each other.

Further, the number of activation regions formed simultaneously or substantially simultaneously is not particularly limited. In general, a plurality of simultaneously or substantially simultaneously formed activation regions can include up to 1000, up to 100, up to 50, up to 20, or up to 10 simultaneously or substantially simultaneously formed activation regions. In some cases, a plurality of simultaneously or substantially simultaneously formed activation regions includes 2-10, 2-20, 2-30, 2-40, 2-50, 2-60, 2-70, 2-80, 2-90, 2-100, 10-100, 50-100, 75-100, 100-200, 100-300, 100-400, 100-500, or 100-1000 simultaneously or substantially simultaneously formed activation regions. However, the specific number of activation regions formed in a manner described herein may, in some cases, be limited by the number and/or power of the ultrasound transducer(s) used to simultaneously form the activation regions, as opposed to being limited by other factors, such as the optical resolution of the relevant detector, which, in some preferred embodiments, comprises a camera, such as a camera previously discussed herein. In some cases, a plurality of first photoluminescence signals are directly detected using a camera. The plurality of first photoluminescence signals can be simultaneously within the field of view of the camera, and, in some cases, the camera is stationary relative to the exterior surface of the environment.

A method such as described above, in which multiple activation regions are formed simultaneously and in which these activation regions provide multiple optical spots from which USF emission can be detected simultaneously, can improve overall USF imaging speed in at least two ways. First, such a method can provide faster imaging by combining multiple "cooling periods" into a single cooling period, during which multiple activation regions can be cooled simultaneously to a temperature below the thermal contamination limit, rather than being cooled sequentially For example, if a single ultrasound transducer placed in a single position (or scanning location) with respect to an imaged environment produced six activation regions within the environment simultaneously, then even if cooling periods or other wait times were needed between scanning locations or ultrasound exposure events, the method would still be approximately six times faster, since six cooling periods or other events could occur at the same time.

Second, a method described herein, in some embodiments, may also be combined with other methods described herein for improving imaging speed. For instance, in some embodiments, a method described herein can further comprise (f) subsequently exposing the environment to the plurality of ultrasound beams to create a plurality of second activation regions within the environment, the plurality of second activation regions having a temperature greater than or equal to the switching threshold temperature; (g) disposing the population of fluorophores within the plurality of second activation regions to switch a plurality of fluorophores of the population from an off state to an on state; (h) exposing the environment to a beam of electromagnetic radiation, thereby exciting the plurality of fluorophores in the on state within the plurality of second activation regions; and (i) detecting a plurality of second photoluminescence signals emitted by the plurality of excited fluorophores at a plurality of second optical spots on the exterior surface of the environment, the plurality of second optical spots corresponding to the plurality of second activation regions within the environment, wherein the plurality of second activation regions are formed simultaneously; wherein the plurality of second optical spots are optically resolvable spatially from one another on the exterior surface of the environment; and wherein the plurality of second optical spots are optically resolvable spatially from the plurality of first optical spots on the exterior surface of the environment.

Moreover, as described above, the plurality of second activation regions can be created within an environment and the plurality of second photoluminescence signals can be detected on an exterior surface before the plurality of first activation regions have cooled below the switching threshold temperature or below some other meaningful or critical temperature, such as a temperature that is within 20° C., 15° C., or 10° C. of the switching threshold temperature.

Additionally, as described above, there is no particular limit on the number of "sets" of activation regions that can be generated and used for imaging, including when approaches described herein are combined with one another. For example, in some cases, a method described in the immediately preceding paragraphs can further comprise ($f_n$) subsequently and sequentially exposing the environment to the plurality of ultrasound beams to create n additional pluralities of additional activation regions within the environment, the additional activation regions having a temperature greater than or equal to the switching threshold temperature; ($g_n$) disposing the population of fluorophores within the additional activation regions to switch a plurality of fluorophores of the population from an off state to an on state; ($h_e$) sequentially exposing the environment to a beam of electromagnetic radiation an additional n times, thereby sequentially exciting the plurality of fluorophores in the on state within the additional activation regions; and ($i_n$) sequentially detecting n additional pluralities of additional photoluminescence signals emitted by the excited fluorophores within the additional activation regions at n additional pluralities of additional optical spots on the exterior surface of the environment. It is to be understood that the additional optical spots correspond, respectively and sequentially, to the additional activation regions within the environment. Moreover, n is an integer between 1 and 1000, and each subsequent plurality of additional optical spots is optically resolvable spatially on the exterior surface of the environment from the immediately preceding plurality of additional optical spots. In some cases, each subsequent plurality of additional optical spots is optically resolvable spatially on the exterior surface of the environment from all other preceding pluralities of additional optical spots.

Turning now in more detail to specific steps of methods described herein, methods described herein comprise disposing a population of ultrasound-switchable fluorophores in an environment. Any environment not inconsistent with the objectives of the current disclosure can be used. In some embodiments, the environment is a biological environment, and in some cases, a biological compartment. An environment of a method described herein can also be a non-biological environment. In some cases, a biological environment is an in vivo environment, such as a tissue, organ, blood vessel, or other portion of a living organism. In some embodiments, the biological environment comprises a tumor or tumor vasculature. The tumor or tumor vasculature can be located in any tissue or organ in a living organism, such as breast, prostate, head, neck, throat, mouth, thyroid, skin, colon, cervix, or uterus. In other cases, a biological environment comprises an in vitro environment, such as a tissue culture. The biological environment of a method described herein can also comprise or be replaced by a biological phantom material or tissue-mimicking phantom material, such as an agar, silicone, polyvinyl alcohol (PVA) gel, polyacrylamide (PAA) gel, or a dispersion of an oil in gelatin. Other phantom materials can also be used.

Moreover, in some embodiments, a biological environment comprises deep tissue. "Deep" tissue, for reference purposes herein, comprises tissue (or, in the case of a phantom material, an interior region of the phantom material) that is located at least about 1 cm below the exterior or outer surface of the organism, tissue culture, or other larger structure associated with the biological environment (such as, in the case of a phantom material, the outer surface of the phantom material). In some embodiments, for instance, deep tissue is located between about 1 cm and about 10 cm, between about 1 cm and about 6 cm, or between about 1 cm and about 5 cm below an outer surface. In some cases, deep tissue is located more than 10 cm below an outer surface. Further, an outer surface, in some embodiments, comprises the surface of a skin of an organism.

Any ultrasound-switchable fluorophore or combination of differing ultrasound-switchable fluorophores not inconsistent with the objectives of this disclosure can be used. For example, in some embodiments, a fluorophore described herein comprises a Førster resonance energy transfer (FRET) donor species and a FRET acceptor species, and the distance between the FRET donor species and the FRET acceptor species is altered by the presence of an ultrasound beam. The FRET donor species can be a first fluorescent species or other chromophore, and the FRET acceptor species can be a second fluorescent species or other chromophore. In such cases, as understood by one of ordinary skill in the art, FRET energy transfer between the donor species and the acceptor species can result in quenching of the fluorescence of the donor species. Thus, the acceptor species can be considered to be a fluorescence quenching species of the fluorophore. Any donor-acceptor pair not inconsistent with the objectives of the current disclosure can be used in FRET-based fluorophores described herein. For example, in some cases, the donor species comprises Alexa Fluor 546 and the acceptor species comprise Alexa Fluor 647. Other combinations of acceptor species and donor species are also possible.

In some embodiments, a fluorophore described herein comprises a microbubble comprising one or more FRET donor species and one or more FRET acceptor species attached to the exterior surface of the microbubble, wherein the microbubble is operable to change in size in response to the presence of an ultrasound beam. The change in size can increase or decrease the distance between the FRET donor species and the FRET acceptor species, thus reducing or increasing the FRET energy transfer efficiency. As a result, the fluorescence quenching and the overall fluorescence intensity of the microbubble can vary based on the size of the microbubble.

A microbubble described herein can have any size and be formed of any chemical species not inconsistent with the objectives of this disclosure. In some cases, a microbubble has a diameter between about 1 μm and about 10 μm or between about 1 μm and about 5 μm. However, the diameter of the microbubble is not limited to these sizes, and, in some cases, other sizes of microbubbles can also be used. In some embodiments, a microbubble described herein comprises a gas core surrounded by a shell formed from a polymeric material, such an organic polymeric material. In other cases, the shell is formed from a lipid material. In some embodiments, a microbubble comprises a shell formed from one or more of albumin, galactose, lipid, and sulfur hexafluoride. In addition, the gas core of a microbubble described herein can comprise one or more of air, nitrogen, and a perfluorocarbon such as octafluoropropane. Moreover, in some cases, a microbubble described herein can be formed from a commercially available microbubble, such as a SonoVue™, Optison™, Imagent™, Definity™, or Targestar™ microbubble. A FRET donor and/or acceptor species described herein can be attached to the surface of such a microbubble in any manner not inconsistent with the objectives of the current invention. In some cases, for instance, a donor and/or acceptor species is attached to the exterior surface of a commercially available microbubble using one or more of a carbodiimide, maleimide, or biotin-streptavidin coupling scheme. Moreover, any other coupling scheme not inconsistent with the objectives of the current disclosure can be used to attach a donor and/or acceptor species to a microbubble.

In an embodiment, gas-filled micro-particles, such as the above described microbubbles, generate a short but high temperature pulse in and around the particle surface when the microbubble is irradiated with an ultrasound pulse at diagnostic intensity level. This short temperature pulse spatially decays very fast (only ~0.2° C. left at a distance of 1 micron away from the bubble surface). In ultrasound imaging, tissue overheating caused by microbubbles is minimalized from this fast temperature decay. However, this microscopic heating principle is effective for heating ultrasound switchable fluorophores, because ultrasound switchable fluorophores are small nanoparticles that can be attached on the microbubble's surface. In some embodiments, ultrasound switchable fluorophores can be attached to a microbubble via a biotin/streptavidin linkage. Moreover, any other linkage not inconsistent with the objectives of this disclosure can be used to attach ultrasound switchable fluorophores to a microbubble.

In some embodiments, a highly ultrasound-absorbing polymer, such as a biodegradable polyurethane with pendent carboxyl groups (PU—COOH), can alternatively be used instead of the microbubbles. These ultrasound-absorbing polyurethanes can form relatively rigid gas-filled sub-micro-particles (~700 nm in diameter). For example, in some embodiments, an ultrasound-absorbing polymer can comprise a Pluronic polymer with pendent carboxyl groups similar in size to the polyurethanes, such as F127, F98, F98-PEG20k, F98-PEG30k, F98-PEG40k, F68 and its PEGylated polymers, which have been functionalized to incorporate pendent carboxyl groups. These ultrasound-absorbing polymers are generally smaller in diameter than microbubbles, reducing their acoustic attenuation compared to microbubbles. However, their relatively rigid structures can sometimes display more resilient bio-stability than microbubbles. Similar to the microbubbles, biotin can be incorporated onto the surface of the ultrasound-absorbing polymers, and the USF contrast agents can be attached using the streptavidin linkage. Moreover, any other coupling scheme not inconsistent with the objectives of the current disclosure can be used to attach a donor and/or acceptor species to a microbubble.

In some embodiments, a fluorophore described herein comprises a thermoresponsive polymer. A "thermoresponsive" polymer, for reference purposes herein, comprises a polymer having a physical or chemical property that changes in a temperature-dependent manner, wherein the change is a discontinuous or binary change. For example, in some cases, the physical conformation or polarity of a thermoresponsive polymer changes in a temperature-dependent manner, and the thermoresponsive polymer exhibits a first conformation below a threshold temperature and a second, substantially different conformation above the threshold temperature. In some embodiments, for instance, a thermoresponsive polymer exhibits an expanded coil or chain confirmation below a threshold temperature and exhibits a compact or globular conformation above the threshold temperature. In some such cases, the threshold temperature can be referred to as the "lower critical solution temperature" (LCST) of the polymer.

Any thermoresponsive polymer not inconsistent with the objectives of this disclosure can be used. In some embodiments, a thermoresponsive polymer comprises a poly(N-isopropylacrylamide) or a copolymer of N-isopropylacrylamide with one or more of acrylamide, N-tert-butylacrylamide, acrylic acid, allylamine, or a polyoxypropylene-polyoxyethylene block copolymer. In other cases, a thermoresponsive polymer comprises a poly(N-vinylcaprolacatam) (PVCL) or a poloxamer such as a Pluronic polymer. Other thermoresponsive polymers can also be used.

Additionally, in some cases, a thermoresponsive polymer of a fluorophore described herein comprises one or more fluorescent moieties or is conjugated to one or more fluorescent species, such as one or more fluorescent dye molecules. The fluorescent dye molecules can comprise any fluorescent dyes not inconsistent with the objectives of this disclosure, such as the commercially available ZnPC (Zinc phthalocyanines) family of dyes (e.g., ZnPc, ZnPcTTB, ZnPcHF, ZnPcOB, among others), the ADP(CA)2 family of dyes, or ICG-based agents (indocyanine greens). The thermoresponsive polymer can be conjugated to the fluorescent species in any manner not inconsistent with the objectives of this disclosure. For example, in some cases, a thermoresponsive polymer is coupled to a fluorescent species through one or more covalent bonds such as one or more ester bonds or one or more amide bonds.

Some non-limiting examples of an ultrasound-switched fluorescence process using a thermoresponsive fluorophore are illustrated in U.S. Patent Application Publication No. 2015/0309014 to Yuan et al. (hereinafter "the '014 publication"), which is incorporated herein in its entirety. As described in the '014 publication, a thermoresponsive polymer can be conjugated to a fluorescent species to provide a fluorophore. The fluorophore has a chain conformation and a globular conformation described hereinabove, and the conformation is temperature-dependent. Further, the transition from one conformation to the other results in a change in the fluorescence intensity or lifetime of the fluorescent species. As described further herein, the change in fluorescence intensity or lifetime can be due to differences in the microenvironment of the fluorescent species when the polymer is in the chain conformation compared to the globular conformation. For example, in some cases, the polarity and/or viscosity of the polymer environment experienced by the fluorophore changes depending on whether the polymer is in the chain conformation or the globular conformation.

Further, in some embodiments, a fluorophore described herein comprises a fluorescent material dispersed in and/or attached to the surface of a thermoresponsive polymer nanoparticle. Moreover, the fluorescence properties of the fluorescent material can be dependent on a change of the conformation, polarity, or other physical or chemical property of the polymer nanoparticle. In addition, the property change can be a temperature-dependent change. In this manner, a change in temperature of the thermoresponsive polymer nanoparticle can result in a change in fluorescence intensity and/or lifetime of the fluorescent material, including a change between an on state of the fluorescent material and an off state of the fluorescent material.

For example, in some embodiments, a thermoresponsive polymer nanoparticle can exhibit a temperature-dependent polarity, and the fluorescent material dispersed in the nanoparticle can exhibit a polarity-dependent fluorescence intensity and/or lifetime. Thus, a change in the temperature of the nanoparticle can result in a change in the fluorescence intensity and/or lifetime of the fluorophore.

In another exemplary embodiment, a thermoresponsive polymer nanoparticle can have a hydrophilic interior below a threshold temperature and a hydrophobic interior above the threshold temperature. Thus, such a nanoparticle can exhibit a temperature-dependent size when dispersed in a polar or non-polar solvent. For example, when dispersed in water or another polar solvent below the threshold temperature, the nanoparticle can exhibit a larger size due to the presence of water in the hydrophilic interior of the nanoparticle. Similarly, above the threshold temperature, the nanoparticle can exhibit a smaller size due to the exclusion of water from the now hydrophobic interior of the nanoparticle. In this manner, a fluorescent material dispersed in the nanoparticle can have a temperature-dependent concentration, which can result in temperature-dependent fluorescence properties of the overall fluorophore. This process is illustrated schematically in the '014 publication, specifically in FIG. 2.

In some embodiments, an ultrasound-switchable fluorophore is formed by incorporating a fluorescent material such as a fluorescent dye within the interior of a polymeric nanoparticle or micelle, such that the polymeric nanoparticle or micelle acts as a nanocapsule for the fluorescent material. Moreover, the polymeric nanoparticle can be formed from a thermoresponsive polymer, such as a thermoresponsive polymer described hereinabove. Non-limiting examples of polymers suitable for forming nanocapsules described herein include Pluronic F127, F98, F98-PEG20k, F98-PEG30k, F98-PEG40k, F68 and its PEGylated polymers, poly(N-isopropylacrylamide) or a copolymer of N-isopropylacrylamide with one or more of acrylamide, N-tert-butylacrylamide, acrylic acid, allylamine, or a polyoxypropylene-polyoxyethylene block copolymer, or poly(N-vinylcaprolacatam) (PVCL). Moreover, in some instances, a nanoparticle or nanocapsule can be formed by copolymerizing a thermoresponsive polymer described hereinabove with a polyethylene glycol (PEG) and/or by conjugating a PEG as a pendant group to a thermoresponsive polymer. Such a fluorophore, in some cases, can have a switching threshold that is controlled at least in part by the inclusion of PEG, as described further in the '014 publication.

A polymer nanoparticle such as a thermoresponsive polymer nanoparticle or a polymer nanocapsule described herein can have any size or shape not inconsistent with the objectives of the current disclosure. In some embodiments, for instance, a thermoresponsive polymer nanoparticle is substantially spherical and has a diameter between about 10 nm and about 300 nm, between about 50 nm and about 250 nm, between about 50 nm and about 200 nm, or between about 70 nm and about 150 nm. In some cases, a polymer nanocapsule is substantially spherical and has a diameter of less than about 100 nm or less than about 50 nm. In some instances, a polymer nanocapsule has a size between about 20 nm and about 90 nm, between about 20 nm and about 80 nm, or between about 20 nm and about 70 nm. Other sizes and shapes are also possible.

Further, any fluorescent material not inconsistent with the objectives of the current invention can be dispersed in and/or attached to a thermoresponsive polymer nanoparticle or other polymer nanoparticle to form a fluorophore described herein. In some embodiments, as described herein, the fluorescent material exhibits a polarity-sensitive fluorescence intensity and/or lifetime. In other cases, the fluorescent material exhibits a temperature-dependent, viscosity-dependent, pH-dependent, and/or an ionic strength-dependent fluorescence intensity and/or lifetime.

Non-limiting examples of fluorescent materials suitable for use in some embodiments described herein include organic dyes such as N,N-dimethyl-4-benzofurazansulfonamide (DBD); 4-(N,N-dimethylaminosulfonyl)-7-(2-aminoethylamino)-2,1,3-benzoxadiazole (DBD-ED); indocyanine green (ICG); a Dylight-700 such as Dylite-700-2B; IR-820; 3,3'-Diethylthiatricarbocyanine iodide (DTTCI); LS-277; LS-288; a cypate; a rhodamine dye such as rhodamine 6G or rhodamine B; or a coumarin. In some instances, a fluorescent material comprises an azadipyrromethene. In addition, in some cases, a fluorescent material comprises an inorganic species such as a semiconductor nanocrystal or quantum dot, including a II-VI semiconductor nanocrystal such as ZnS or CdSe or a III-V semiconductor nanocrystal such as InP or InAs. In other instances, a fluorescent material comprises a Lanthanide species. Additional non-limiting examples of fluorescent materials suitable for use in an ultrasound-switchable fluorophore described herein include the fluorescent materials described in Amin et al., "Syntheses, Electrochemistry, and Photodynamics of Ferrocene-Azadipyrromethane Donor-Acceptor Dyads and Triads," *J. Phys. Chem. A* 2011, 115, 9810-9819; Bandi et al., "A Broad-Band Capturing and Emitting Molecular Triad: Synthesis and Photochemistry," *Chem. Commun.*, 2013, 49, 2867-2869; Jokic et al., "Highly Photostable Near-Infrared Fluorescent pH Indicators and Sensors Based on $BF_2$-Chelated Tetraarylazadipyrromethane Dyes," *Anal. Chem.* 2012, 84, 6723-6730; Jiang et al., "A Selective Fluorescent Turn-On NIR Probe for Cysteine," *Org. Biomol. Chem.*, 2012, 10, 1966-1968; and Kucukoz et al., "Synthesis, Optical Properties and Ultrafast Dynamics of Aza-boron-dipyrromethane Compounds Containing Methoxy and Hydroxy Groups and Two-Photon Absorption Cross-Section," *Journal of Photochemistry and Photobiology A: Chemistry* 247 (2012), 24-29; the entireties of which are hereby incorporated by reference. Other fluorescent materials can also be used.

An ultrasound-switchable fluorophore described herein can have any fluorescence emission profile not inconsistent with the objectives of the current invention. For example, in some embodiments, a fluorophore exhibits an emission profile including visible light or centered in the visible region of the electromagnetic spectrum, such as between 450 nm and 750 nm, 500 nm and 700 nm, or 550 nm and 650 nm. In some cases, a fluorophore exhibits an emission profile including infrared (IR) light or centered in the IR region of the electromagnetic spectrum. For example, in some instances, a fluorophore described herein exhibits an emission profile centered in the near-IR (NIR, 750 nm-1.4 µm), short-wavelength IR (SWIR, 1.4-3 µm), mid-wavelength IR (MWIR, 3-8 µm), or long-wavelength IR (LWIR, 8-15 µm). Moreover, in some embodiments, a fluorophore described herein has an emission profile overlapping with a wavelength at which water and/or biological tissue has an absorption minimum, such as a wavelength between about 700 nm and about 800 nm or between about 1.25 µm and about 1.35 µm. Additionally, in some cases, a population of ultrasound-switchable fluorophores described herein comprise fluorophores having differing emission profiles for purposes of multiplexed imaging. For example, in some cases, a first fluorophore of a population can emit in the NIR and a second fluorophore of the population can emit in the visible region of the electromagnetic spectrum. In some instances, a fluorophore of the population has an emission spectra in one portion of the NIR, and the second fluorophore of a population has emission spectra in a different portion of the NIR.

In some embodiments, different populations of ultrasound-switchable fluorophores described herein comprise the same fluorophore having the same emission profiles. However, in some embodiments, different populations of ultrasound-switchable fluorophores described herein comprise different fluorophores having different emission profiles for purposes of multiplexed imaging. For example, in a non-limiting embodiment, an emission profile of a first population of ultrasound switchable fluorophores can have a first fluorophore between about 680 nm and about 710 nm, and the emission profile of a second population of ultrasound switchable fluorophores having a second fluorophore can be between about 740 nm and about 770 nm. In embodiments having a third population of ultrasound switchable fluorophores having a third fluorophore, the emission profile of a third fluorophore can be >840 nm. These emission profiles are merely exemplary, and in some instances the first, second, or third ultrasound-switchable fluorophores comprise a fluorescent material having a peak emission wavelength between 680 nm and 710 nm; between 740 nm and 770 nm, or >800 nm. In some instances, the first ultrasound-switchable fluorophores are configured to emit light having a first average peak wavelength and the second ultrasound-switchable fluorophores are configured to emit light having a second average peak wavelength, and wherein the second average peak wavelength is 25-75 nm longer than the first average peak wavelength. Moreover, this general principle can be applied to embodiments where n populations of ultrasound switchable fluorophores having n fluorophores are used. For example, a third ultra-sound switchable fluorophore can be configured to emit light having a third average peal wavelength that is 25 nm to 75 nm longer than the second average peak wavelength. In this manner, multiplexed imaging can be achieved.

In some embodiments, an ultrasound-switchable fluorophore described herein comprises a targeting moiety. A "targeting moiety", for reference purposes herein, comprises a molecule having a physical or chemical binding affinity for a target element present in the environment. In cases where the environment is biological or phantom biological, the targeting moiety can be an antibody with specificity to a biomarker present in the environment. For example, the antibodies can have specificity to angiogenic biomarkers, such as non-limiting examples of vascular endothelial growth factor receptor (VEGFR), integrin, CD105, P-selectin, or any other angiogenic biomarkers known to those of ordinary skill in the art. The antibodies can have specificity to biomarkers uniquely overexpressed in cancer stem cells (CSCs), such as monoclonal antibodies anti-CD44, anti-CD133, anti-CD117, among others. In other instances, the targeting moiety can be a small molecule, polysaccharide, polypeptide, or any other molecule known to bind to a target element present in a biological environment. In some embodiments, the targeting moiety reversibly binds to the target element. In other embodiments, the targeting moiety irreversibly binds to the target element. In some cases, for instance, the targeting moiety is attached to a targeting ultrasound-switchable fluorophore using one or more of a carbodiimide, maleimide, or biotin-streptavidin coupling mechanism. Moreover, any other coupling scheme not inconsistent with the objectives of the current disclosure can be used to attach a targeting moiety to an ultrasound-switchable fluorophore. It is to be understood that in embodiments where n ultrasound-switchable fluorophores are used, each targeting ultrasound fluorophore can have a different targeting moiety.

Methods described herein also comprise exposing an environment, such as a biological environment, to one or more ultrasound beams to create an activation region within the environment. In some instances, one, two, three, four, five, six, or n ultrasound beams are used, wherein n can equal up to 10, up to 20, up to 30, up to 40, or 50 or more. The ultrasound beam can have any ultrasound frequency not inconsistent with the objectives of the current disclosure. In some embodiments, an ultrasound beam comprises an oscillating sound pressure wave with a frequency of greater than about 20 kHz or greater than about 2 MHz. In some cases, an ultrasound beam described herein has a frequency of up to about 5 GHz or up to about 3 GHz. In some embodiments, an ultrasound beam has a frequency between about 20 kHz and about 5 GHz, between about 50 kHz and about 1 GHz, between about 500 kHz and about 4 GHz, between about 1 MHz and about 5 GHz, between about 2 MHz and about 20 MHz, between about 2 MHz and about 10 MHz, between about 5 MHz and about 200 MHz, between about 5 MHz and about 15 MHz, between about 200 MHz and about 1 GHz, between about 500 MHz and about 5 GHz, or between about 1 GHz and about 5 GHz.

In addition, an ultrasound beam can have any power not inconsistent with the objectives of the current disclosure. In some embodiments, for instance, an ultrasound beam has a power between about 0.1 $W/cm^2$ and about 10 $W/cm^2$, between about 0.1 $W/cm^2$ and about 5 $W/cm^2$, between about 0.5 $W/cm^2$ and about 5 $W/cm^2$, between about 1 $W/cm^2$ and about 10 $W/cm^2$, or between about 1 $W/cm^2$ and about 5 $W/cm^2$. In other cases, an ultrasound beam has a power between about 100 $W/cm^2$ and about 5000 $W/cm^2$, or between about 100 $W/cm^2$ and about 3000 $W/cm^2$. In some cases, the use of an ultrasound beam having a high power, such as a power described herein, can result in the generation of non-linear effects within the activation region. Moreover, in some embodiments, the effective size of the activation region can be reduced in this manner, leading to improved imaging resolution.

An environment can be exposed to an ultrasound beam in any manner not inconsistent with the objectives of the current disclosure. For example, in some embodiments, a biological environment is exposed to an ultrasound beam described herein for only a limited duration. In some cases, for instance, the ultrasound beam is provided to the environment for less than about 1 second or less than about 500 ms. In some embodiments, the ultrasound beam is provided to the environment for less than about 300 ms, less than about 100 ms, less than about 50 ms, or less than about 10 ms. In some cases, the ultrasound beam is provided to the environment for about 1 ms to about 1 second, about 1 ms to about 500 ms, about 1 ms to about 300 ms, about 1 ms to about 100 ms, about 1 ms to about 50 ms, about 1 ms to about 10 ms, about 10 ms to about 300 ms, about 10 ms to about 100 ms, about 10 ms to about 50 ms, or about 50 ms to about 100 ms. The use of short exposure times of a biological environment to an ultrasound beam, in some embodiments, can permit the time-gating of fluorescence signals, such that a desired USF signal can be temporally separated from one or more undesired or non-analyte fluorescence signals, such as a tissue autofluorescence signal or a signal from a randomly switched-on fluorophore.

Moreover, the ultrasound beam can be a continuous wave beam or a pulsed or modulated beam. The use of a modulated or pulsed ultrasound beam, in some embodiments, can further improve the signal to noise ratio (SNR) of a method described herein by permitting frequency-gated detection of the USF signal. For example, in some cases, a pulsed or modulated ultrasound beam provides an ultrasound exposure having a specific frequency or modulation. As a result, the corresponding USF signal can also exhibit the same specific frequency or modulation. Thus, in some such cases, a lock-in amplifier is used to increase the sensitivity of the detector to the specific frequency or modulation, thus increasing the overall sensitivity and SNR of the method.

In some embodiments of methods described herein, a single ultrasound beam is directed toward the environment using a single ultrasound transducer, such as a high intensity focused ultrasound (HIFU) transducer. In other instances, a plurality of ultrasound beams is directed toward the environment using a plurality of ultrasound transducers. Moreover, in some cases, a first ultrasound beam is directed toward the environment at a first angle and/or from a first direction, and a second ultrasound beam is directed toward the environment at a second angle and/or from a second direction differing from the first angle and/or direction. In some embodiments, for instance, the first and second directions are orthogonal or substantially orthogonal directions, such as directions separated by 80 to 100 degrees. In other cases, the directions are separated by less than 80 degrees or more than 100 degrees. Further, if desired, additional ultrasound beams can also be directed toward the environment from additional directions or at additional angles. In such cases, the focal zones of the beams can overlap or intersect with one another to form an activation region at the intersection of the beams. In this manner, an activation region can have a smaller volume or cross section than the focal zone or cross section of a single ultrasound beam used to generate the activation region, thereby improving imaging resolution. In some cases, for instance, the activation region has a lateral dimension and/or an axial dimension of less than about 2 mm, less than 1.5 mm, or less than about 1 mm. In some embodiments, the activation region has a lateral dimension and/or an axial dimension of less than about 700 μm or less than about 500 μm. In some embodiments, the activation region has a lateral dimension and/or an axial dimension of about 300 μm to about 2 mm, about 400 μm to about 1.5 mm, about 400 μm to about 1 mm, about 400 μm to about 700 μm, or about 400 μm to about 500 μm. In some cases, the lateral and axial dimensions both have a size recited herein, including a size below about 1 mm or below about 700 μm. Moreover, in some embodiments, the lateral and axial dimensions of the activation region are different, thereby providing a relatively anisotropic activation region. Alternatively, in other instances, the lateral and axial dimensions are substantially the same, thereby providing a relatively "square" or isotropic activation region.

An "activation region," as described above, comprises a region of the environment in which ultrasound-switchable fluorophores described herein are or can be switched from an off state to an on state. For example, in some cases, an activation region comprises a region of high temperature compared to other portions of the environment. Moreover, as described herein, a size, shape, and/or other properties of the activation region can be determined by the number and/or power of the one or more ultrasound beams used to form the activation region. In some cases, for instance, the size and shape of an activation region is defined by the focal zone of a single ultrasound beam. In other cases, an activation region is defined by the overlap of the focal zones of a plurality of ultrasound beams.

A fluorophore described herein can be disposed within an activation region in any manner not inconsistent with the objectives of the current disclosure. In some cases, a fluorophore enters or is disposed within an activation region of an environment by diffusing into the activation region from an adjacent area of the environment. The fluorophore can also be disposed within an activation region directly by injection. In other instances, an activation region is created within a specific location within an environment where it is known that a fluorophore or population of fluorophores is likely to be found or can be found. For example, in some embodiments, an ultrasound beam described herein is scanned in a manner previously discussed herein (such as a Z-scan) across or within an environment, thereby producing a plurality of activation regions in different locations within the environment in a sequential or simultaneous manner.

Methods described herein also comprise exposing an environment to a beam of electromagnetic radiation and/or exciting at least one fluorophore in an on state with a beam of electromagnetic radiation. A fluorophore can be excited with a beam of electromagnetic radiation in any manner not inconsistent with the objectives of the current disclosure. In some embodiments, for instance, a fluorophore is excited using a laser excitation source such as a diode laser. In other instances, a fluorophore is excited using one or more light emitting diodes (LEDs) or a broadband excitation source. Moreover, an excitation source described herein can provide any wavelength of light not inconsistent with the objectives of the current disclosure. In some embodiments, a fluorophore described herein is excited with a beam of electromagnetic radiation comprising visible light, NIR light, or IR light. In other cases, the beam of electromagnetic radiation comprises ultraviolet (UV) light. In some embodiments, a fluorophore described herein is excited with a beam of electromagnetic radiation comprising a wavelength maximum of approximately 671 nm, 730 nm, or 810 nm. The fluorophore can also be excited with a beam of electromagnetic radiation having a wavelength between 600 nm to 900 nm, 650 nm to 850 nm, 700 nm to 800 nm, 600 nm to 800 nm, 600 nm to 700 nm, 700 nm to 900 nm, or 800 nm to 900 nm.

Methods described herein also comprise detecting a photoluminescence signal or other light emitted within an environment or within a specific location within an environment. In some embodiments, for instance, a method comprises detecting light emitted by at least one ultrasound-switchable fluorophore. Light emitted by the fluorophore can be detected in any manner not inconsistent with the objectives of the current disclosure. In some embodiments, for example, detecting light emitted by at least one fluorophore in an on state comprises detecting the light in a time-gated or frequency-gated manner, including a time-gated manner or frequency-gated manner described herein. In some cases, the light emitted by the at least one fluorophore in the on state is detected after a time delay that is longer than the fluorescence lifetime of the fluorophore in the off state or longer than the fluorescence lifetime of another species present in the biological environment. For example, in some embodiments, the light emitted by the at least one fluorophore in the on state is detected after a time delay that is longer than the autofluorescence lifetime of a non-fluorophore species present in the biological environment, such as the autofluorescence lifetime of tissue, which can be up to about 4 ns or up to about 5 ns.

Some embodiments described herein are further illustrated in the following non-limiting Example.

EXAMPLE

Figure 2A:
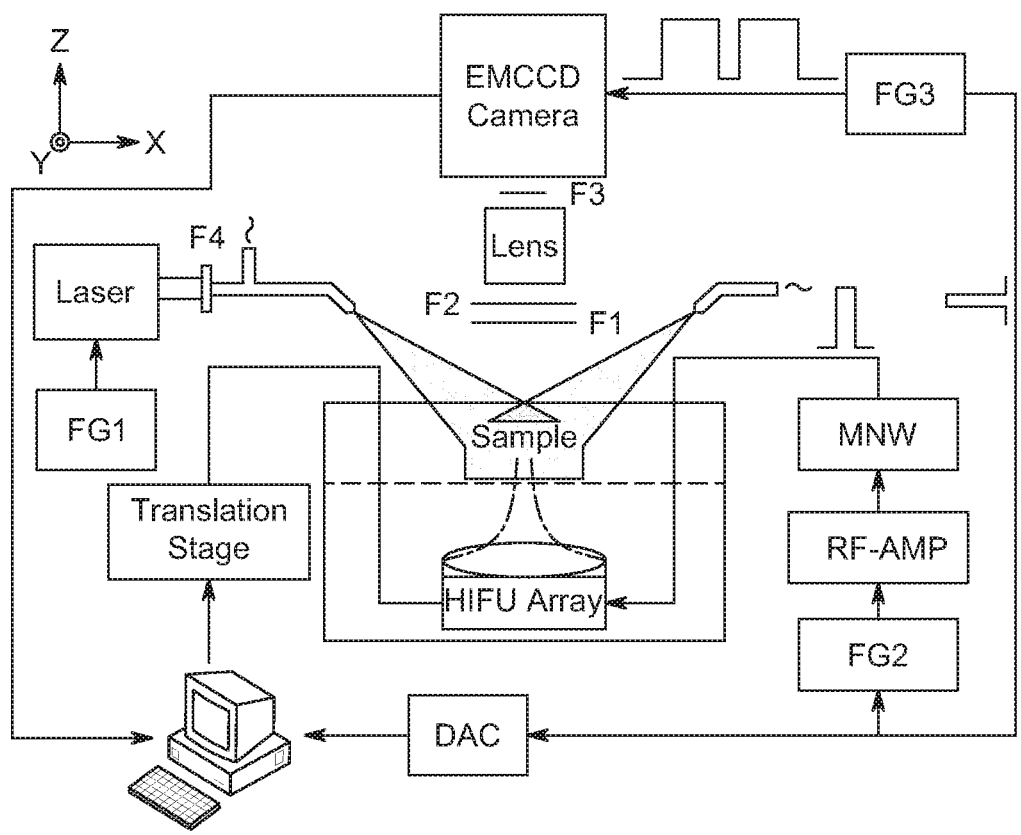
FIG. 2A is a schematic diagram of an embodiment of a camera-based USF imaging system.
Figure 2B:
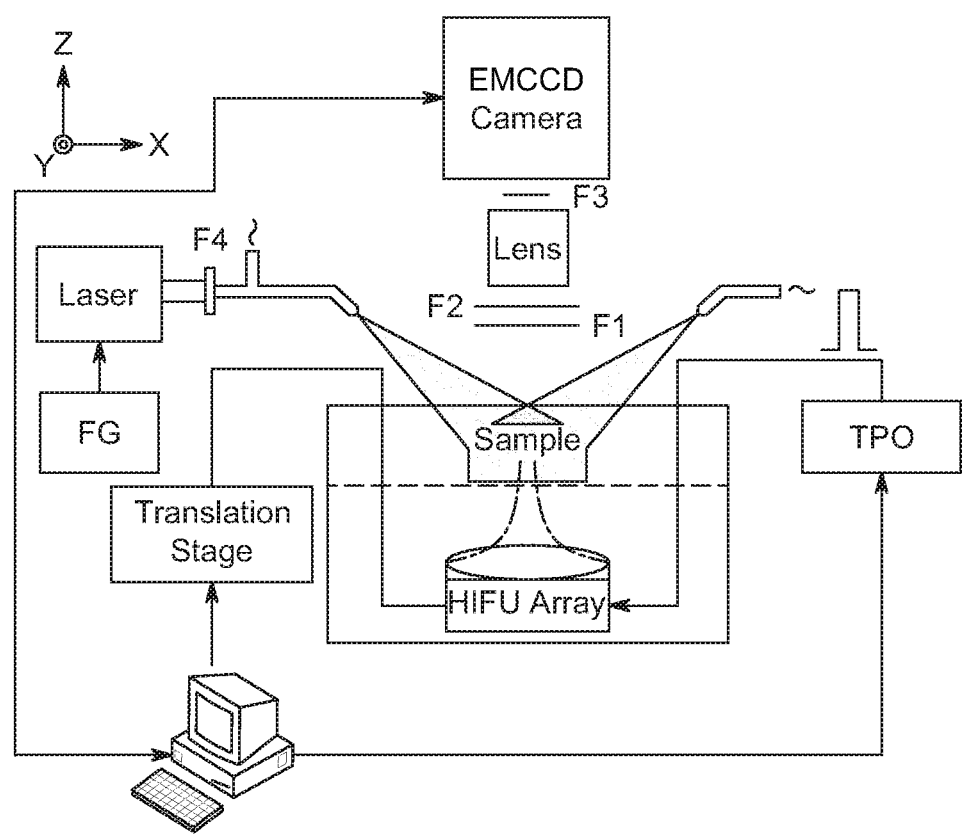
FIG. 2B is a schematic diagram of another embodiment of a camera-based USF imaging system.

FIGS. 2A and 2B show a schematic diagram of two different embodiments of a camera-based USF imaging system described herein that operates in the absence of any fiber optic collectors, where FG is a function generator; RF-Amp is a radio-frequency power amplifier; MNW is a matching network; HIFU is a high intensity focused ultrasound; DAC is a data acquisition card; F1-F3 are emission filters (830 LP); and F4 is an excitation filter (785/62 BP). An electron-multiplying charge-coupled device (EMCCD) camera was used to receive the emitted photons instead of the fiber bundle, which improved the collection efficiency and left enough space between the sample and the detector. Since spatial information of the fluorescence distribution on a tissue surface was also acquired with this system (i.e., as a conventional 2D planar fluorescence imaging system), the desired scan area could be selected exactly. With the camera as the detector, a smart scan method (referred to as "Z-scan" herein) was developed, which improved the imaging speed by at least four times compared with a raster scan method adopted in conventional systems using fiber optic collectors. Two temporally adjacent scan positions were spatially well separated, which significantly reduced the effect of thermal diffusion and signal cross-talk. The resolution of the imaging system of FIG. 2 was explored in the following examples by using a porcine muscle tissue phantom ("phantom") inserted with a silicone tube. The USF images shown herein were validated by a commercial microcomputer tomography (CT) imaging system.

For the camera-based USF imaging system of FIG. 2A, a first function generator (FG1, 33500B, Agilent, Santa Clara, Calif., USA) was used to drive the excitation laser (808 nm, MGL-II-808-2W, Dragon lasers, JL, China). The excitation light passed through a band pass filter (FF01-785/62-25, Semrock Inc., Rochester, N.Y., USA), divided by a dual branch light guide (¼"×72", Edmund Optics Inc., Barrington, N.J., USA) into two equal parts and illuminated the tissue sample that was placed in a water tank from two opposite directions to ensure the uniform illumination. The emitted fluorescence signal was filtered by two 2-inch (BLP01-830R-50, Semrock Inc., Rochester, N.Y., USA) and one 1-inch emission filters (BLP01-830R-25, Semrock Inc., Rochester, N.Y., USA) which were located before and after a camera lens (AF NIKKOR 50 mm f/1.8D Lens, Nikon, Shinagawa, Tokyo, Japan), respectively, and received by an EMCCD camera (ProEM®-HS:1024BX3, Princeton Instruments, Trenton, N.J., USA). A HIFU transducer (2.5 MHz, H-108, Sonic Concepts Inc., Bothell, Wash., USA) driven by the second function generator (FG2, 33500B, Keysight Technologies, Santa Rosa, Calif., USA) was used to switch on/off the USF contrast agent in its focus. The driving signal generated from the FG2 was amplified by a radio frequency power amplifier (RF-AMP, A075, E&I, Rochester, N.Y., USA) with 50 dB gain. The amplified driving signal was then delivered to a matching network (MNW) and then the HIFU transducer to generate an ultrasonic wave. To scan the sample, the HIFU transducer was controlled by a motorized translation stage (Velmex Inc. Bloomfield, N.Y., USA) which received commands from the computer. The computer received the triggers via a data acquisition card (DAC, PCIE-6363, National Instruments, Austin, Tex., USA) from the third function generator (FG3, AFG3252, Tektronix, Beaverton, Oreg., USA) which was used to synchronize the exposure of camera, ultrasound heating and translation stage moving.

For the camera-based USF imaging system embodiment shown in FIG. 2B, a function generator is used to drive the excitation laser. The excitation light passes through a band pass filter F4, divided by a dual branch light guide into two equal parts and illuminates the tissue sample that is placed in a water tank from two opposite directions to ensure uniform illumination. The emitted fluorescence signal is filtered by two 2-inch and one 1-inch emission filters (represented by features F1-F3) that are placed before and after a camera lens, respectively, and received by an EMCCD camera. The 256-channel HIFU transducer array is driven by the transducer power output control system which is controlled by the computer. To extend the scan range, the HIFU transducer array is connected to a 3D motorized translation stage which receives commands from the computer. The computer also controls the exposure of the camera and receives the recorded images. In the proposed imaging system, the XY plane represents the horizontal plane, which is perpendicular to the transmission direction of the ultrasound. The Z direction is the axial direction, which is parallel to the transmission direction of the ultrasound.

Figure 3A:
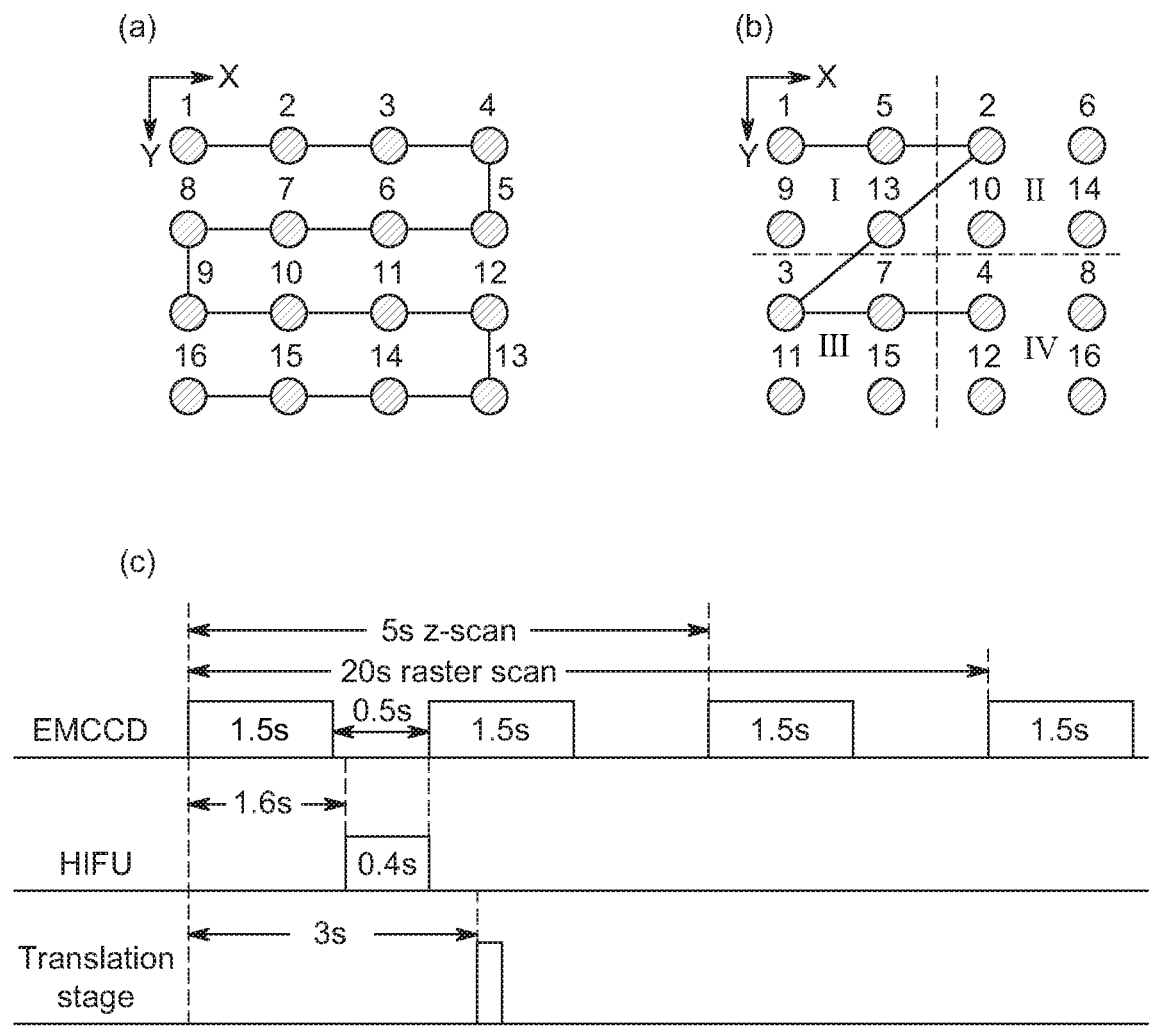
FIG. 3A is a schematic diagram of (a) raster scan and (b) Z-scan; (c) time sequence diagram of the USF imaging system.

The USF imaging system had two scan modes: raster scan and Z-scan. As shown in FIG. 3A(a), in the raster scan mode, the HIFU transducer was scanned from the first point to the fourth point along x-axis positive direction, moved to the fifth point along y-axis positive direction and then scanned the second line along x-axis negative direction. By repeating this process, a two-dimensional (2D) scanning was achieved. This scan method was adopted in previous frequency-domain USF imaging systems. As previously discussed, the transducer did not move to the next adjacent position until the tissue cooled down and the USF signal vanished, which was time consuming.

To overcome this limitation in the present Example, a "Z-scan" was adopted in this camera-based USF imaging system. As one example shown in FIG. 3A(b), in the Z-scan mode, an entire scan region was divided into four equal sub-regions which meant the scan points in x and y directions were even numbered. The scanning sequence of the points is indicated by the numbers. After scanning the first point in the scanning sequence, the HIFU transducer was moved to the second point which was the first point in region II. The HIFU transducer finished scanning all the first points in all the sub-region and then was moved to the fifth point in scanning sequence which was the second point in region I. The moving trajectory of the transducer looked like a character 'Z'. The two adjacent points in scanning sequence were separated in space which meant the temperature rising of the tissue in the former scan position would not affect the current position much. By adopting this scan method, the imaging speed of the proposed camera-based USF imaging system was four times faster than that using the raster scan pattern in FIG. 3A(a). FIG. 3A(c) shows the time sequence diagram of this USF imaging system. The EMCCD camera took two fluorescence images at each scan position and the exposure was controlled by the FG3. The first 1.5 s exposure of the camera was used to record the fluorescence image before ultrasound heating which was a background used for USF signal calculation. The FG3 sent triggers to the FG2 and the DAC at the same time of the first camera exposure. The FG2 delayed the trigger for 1.6 s and sent a driving signal with a duration of 0.4 s to the HIFU transducer. Just after the ultrasound exposure, the second fluorescence image was taken with the same exposure time of 1.5 s as the previous background image. The increase in fluorescence intensity between the two frame images was caused by the HIFU-induced temperature rising, and could be obtained by subtracting the first fluorescence image from the second fluorescence image. The computer received the trigger from FG3 via DAC and then sent command to move the translation stage after 3 s. The time intervals between two adjacent scanning locations in the sequence were 20 s in the raster scan mode and 5 s the Z-scan mode. The 20 s interval in the former was mainly for waiting for tissue cooling and therefore avoiding fluorescence cross-talk between adjacent locations.

The focus of the HIFU transducer was initially positioned on the bottom surface of a small tank that was used for holding the sample. The position of the focus was also identified and calibrated in the field of view of the camera by positioning the ultrasound focus on a silicone tube inserted at the surface of a transparent silicone phantom and calculating the geometry center of the obtained USF signal pattern.

Figure 3B:
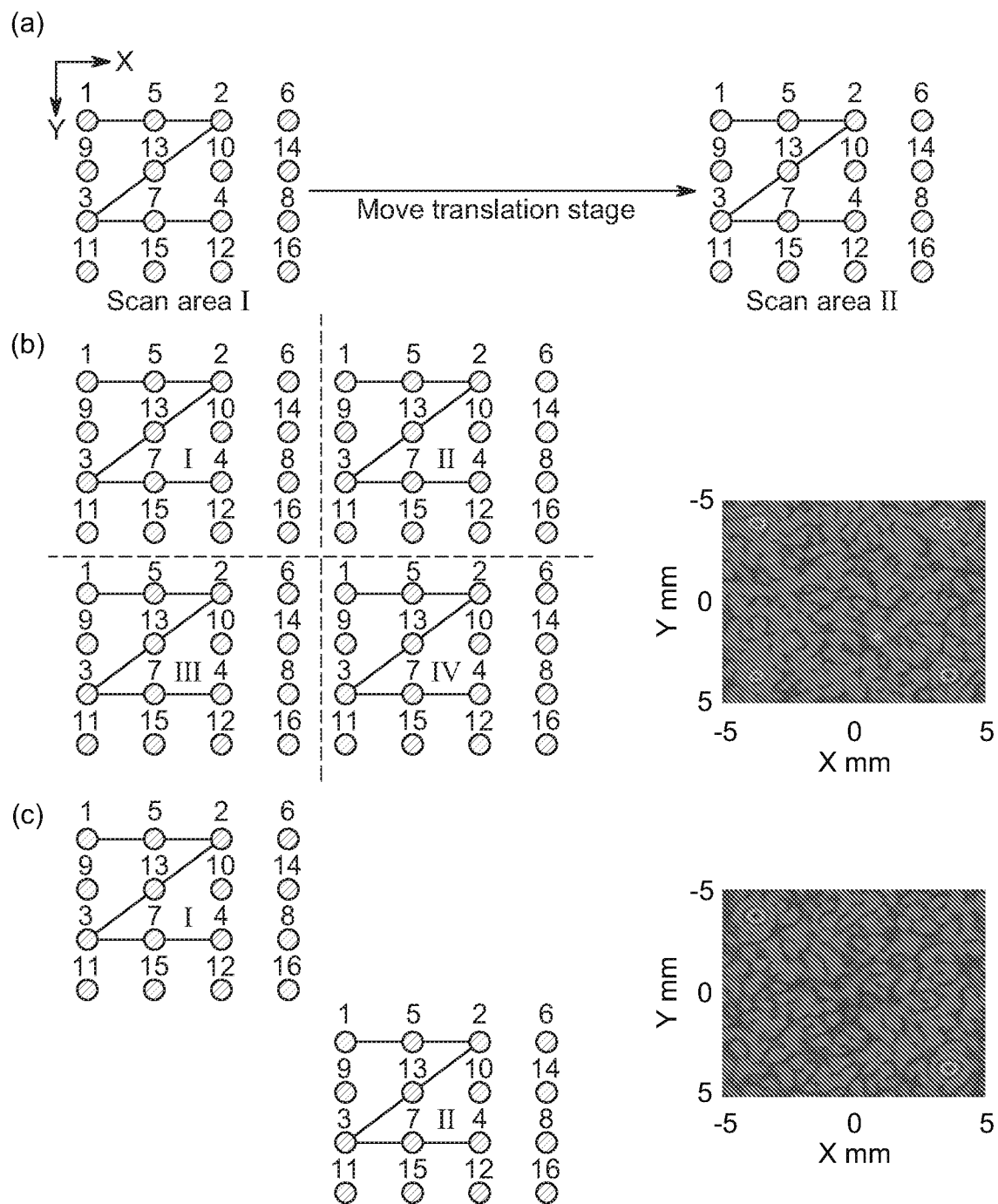
FIG. 3B is a schematic diagram of a two scan method: (a) scan one area via electronically steering the focus; (b) scan four adjacent areas simultaneously via mechanically moving multiple focuses; and (c) scan two separate areas simultaneously via mechanically moving multiple focuses.

Due to the limitation of the steering range of the HIFU array, the 256-channel HIFU arrays shown in FIGS. 2A and 2B are connected to a translation stage to extend the scan range. As shown in FIG. 3B, there are two scan modes used for this system. The schematic diagram of the first scan mode is shown in FIG. 3B(a). A focus is generated and steered electronically by the HIFU array via adjusting the phase of the excitation signal applied to each traducer element. The Z-scan method is also applied to improve the scan speed. After scanning one area electronically, the HIFU array is moved to another position via the translation stage to scan another area. The schematic diagram of the second scan mode is shown in FIGS. 3B(b) and 3B(c). The beam pattern of multiple ultrasound focuses can be generated by the HIFU array (shown in the figures on the right side). Due to the limited steering range, in this scan mode, these focuses are moved by the translation stage instead of being steered electronically to realize scanning multiple areas simultaneously. Each area is scanned by the focus via a Z-scan method. Although the steering range is limited, the advantage of electronically scanning (the first mode) is the fast steering speed. When the limitation of further improving the scanning speed is the time expended to move the transducer mechanically, the electronically scanning is beneficial. However, in many instances, the greater limitation of scanning speed improvement is the relative long cooling time of the tissue, which is attributed to the limitation performance (e.g. relatively small on/off ratio and large transition bandwidth) of the USF contrast agent, which requires high temperature increases. Thus, the ability of the second mode to scan multiple areas simultaneous provides additional benefits for scanning speed improvement.

A. Resolution Measurement of the USF Imaging System

Figure 4:
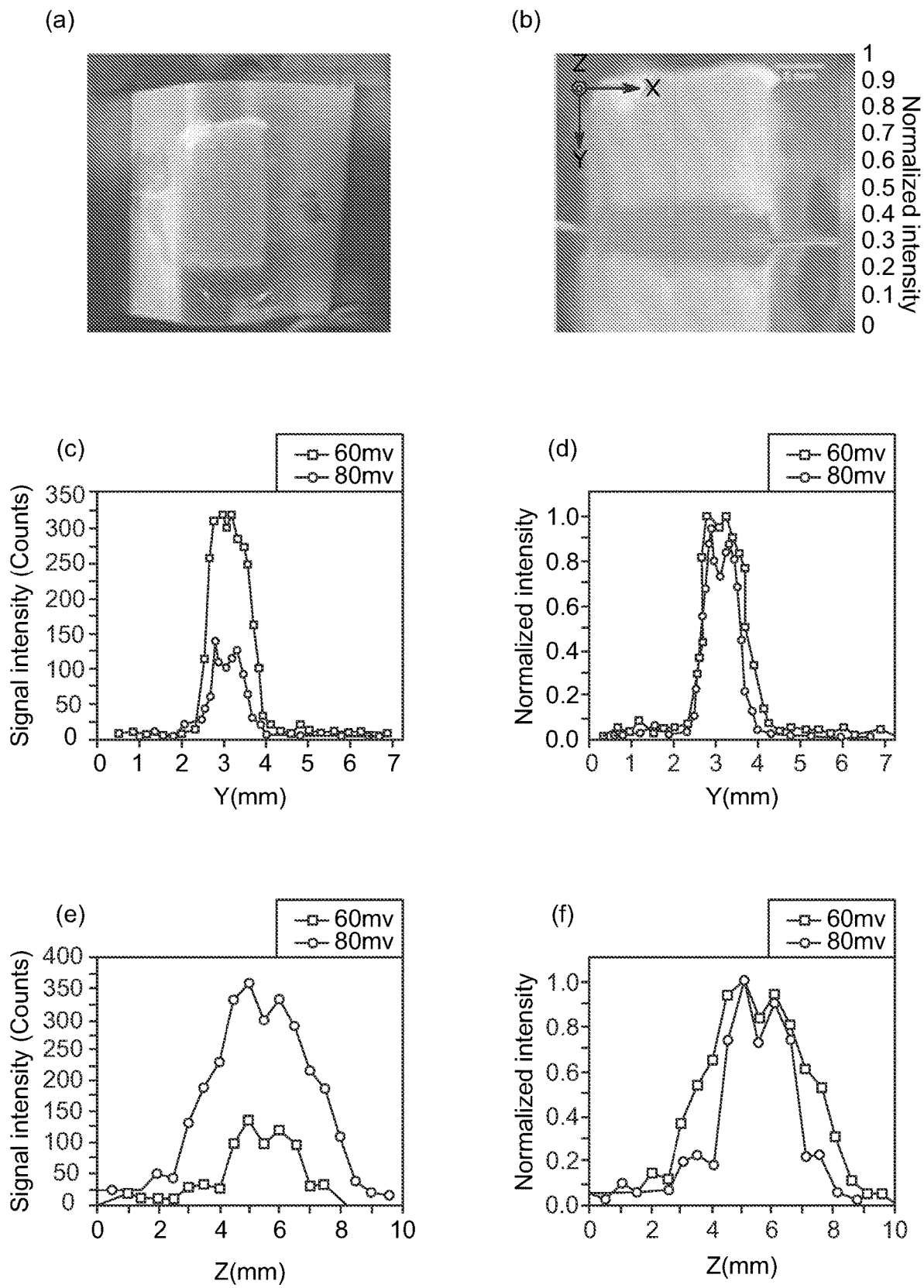
FIG. 4(a) is a white-light photo of the porcine muscle tissue phantom inserted with a silicone tube.
FIG. 4(b) is fluorescence image of the silicone tube filled with ICG-NPs inside the phantom of FIG. 4(a)
FIGS. 4(c) and 4(d) are original and normalized lateral Y-direction 1D profiles, respectively, of a silicone tube of FIG. 4(a) with a driving voltage of 60 mV and 80 mV, respectively.
FIGS. 4(e) and 4(f) are original and normalized lateral Z-direction 1D profiles, respectively, of a silicone tube of FIG. 4(a) with a driving voltage of 60 mV and 80 mV, respectively.

To measure the resolution of the proposed camera-based USF imaging system and the effect of the driving voltage on the resolution, USF imaging was performed on a porcine muscle tissue phantom in which a silicone tube was inserted to mimic a blood vessel. FIG. 4(a) shows a white-light photo of the tissue phantom. A silicone tube (ST 60-011-01, Hellix Medical, Carpinteria, Calif., USA) with an inner diameter of 0.31 mm and outer diameter of 0.64 mm was inserted into the tissue phantom with a thickness of ~10 mm at a depth of ~5 mm. The phantom was placed on a piece of transparent parafilm (PM-992, BEMIS Company Inc. Neenah, Wis., USA) which sealed the rectangle window of a small plastic tank. The gap between the parafilm and the bottom side of the phantom was filled with ultrasound gel (01-08, Aquasonic 100, Parker Laboratories Inc., Fairfield, N.J., USA) to maintain appropriate ultrasound coupling. To prevent the phantom from drying during the experiment, the surface of the phantom was also covered by ultrasound gel and a piece of transparent parafilm. Before USF imaging, the ultrasound focus was positioned on the silicon tube which was then filled with indocyanine green (ICG)-encapsulated poly(N-isopropylacrylamide) nanoparticles (ICG-NPs) with a low critical solution temperature (LCST) of ~24-25° C. The intensity of the excitation light illuminated on the phantom was 6.16 mW/cm$^2$ which was measured by a power and energy meter (PM100D, Thorlabs Inc. Newton, N.J., USA). As shown in FIG. 4(b), the size of the tube shown by fluorescence imaging on the phantom surface is quite large due to high scattering property of the tissue. To obtain the lateral and axial one-dimensional profiles of the silicone tube in USF imaging, the HIFU transducer scanned the tube in Y direction (with a step size of 127 μm and a scanning range of 7.112 mm) and in Z direction (with a step size of 508 μm and a range of 10.16 mm), respectively. FIG. 4(c) shows the lateral (i.e. Y direction) one-dimensional USF profiles of the silicone tube with two various HIFU driving voltages of 60 mV and 80 mV (i.e. the peak-to-peak voltage from FG2, the estimated ultrasound power: 0.43, 0.77 W). As mentioned above, the fluorescence increase can be extracted by subtracting the first fluorescence image (i.e. the background fluorescence image) from the second fluorescence image (i.e. the fluorescence image acquired after HIFU exposure). To convert this subtracted image into a single value of the signal strength to represent the HIFU-induced fluorescence increase at each scan location, a 7×7 pixel moving average filter was applied to the subtracted image. A threshold of 100 counts was set to remove obvious noise. Then, a square with a side length of 1 mm was drawn at the center of the scan position on the processed image. Finally, the photon counts of all the pixels within this square was averaged and used to represent the strength of the HIFU-induced fluorescence increase at current location. Accordingly, a single number could be calculated for each scanning point, and a three-dimensional (3D) USF image could be formed by scanning a 3D volume. Note that the specific threshold and side length might be varied in different phantoms for better USF image quality. The peak values of the USF profiles for the two driving voltages of 60 and 80 mV are 138 and 319 counts, respectively. As shown in FIG. 4(d), the full width at half maximum (FWHM) of the lateral profiles for the two driving voltages are 0.85 and 1.11 mm, respectively. As shown in FIG. 4(e), the peak values of the USF profiles for the two driving voltages of 60 and 80 mV are 136 and 359 counts, respectively. As shown in FIG. 4(f), the FWHM of the lateral profiles for the two driving voltages are 2.46 and 4.19 mm, respectively. The USF signal strength is higher under the larger driving voltage (i.e. higher ultrasound power), which means a better signal-to-noise ratio. However, the increase of FWHM resulted in lower resolution. This is because the higher temperature rise leads to the larger size of the thermal focal zone and results in more USF contrast agents are switched on. It should be noticed that the axial FWHM is about 3-4 times larger than the lateral FWHM which is due to the non-uniform shape of the HIFU transducer focus. The lateral and axial FWHMs of the acoustic intensity focus were measured as 0.55 mm and 2.8 mm, respectively.

B. Comparison of Raster Scan and Z-Scan

Figure 5:
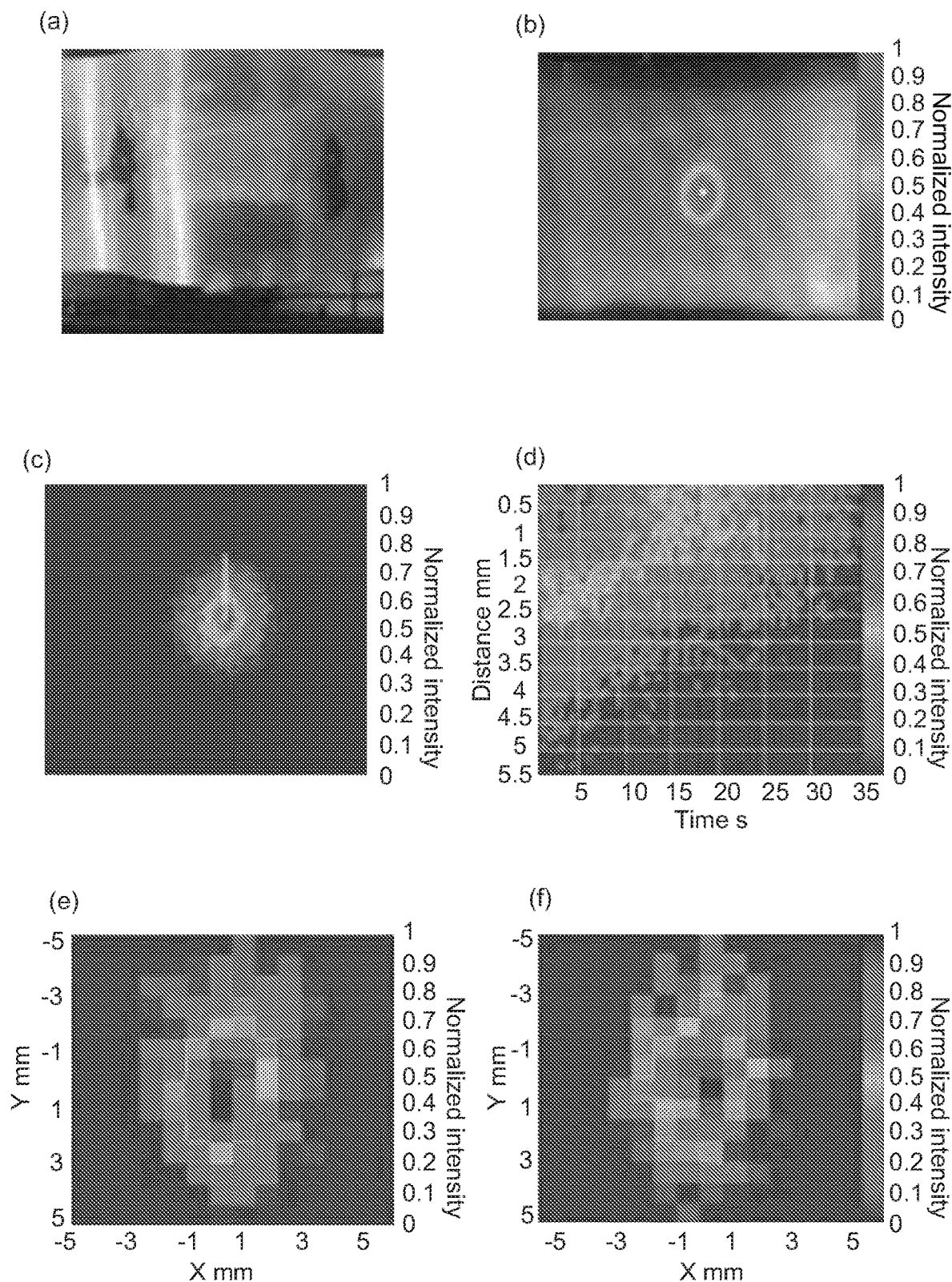
FIG. 5(a) is a white-light photo of the porcine tongue phantom.
FIG. 5(b) is a fluorescence image of the mixed contrast agent distribution in the phantom and the red square indicates the scan area of the USF imaging on the horizontal (XY) plane.
FIG. 5(c) is a pattern of a USF signal for intensity change with time for the phantom of FIG. 5(a)
FIG. 5(d) is a pattern of USF signal intensity change in space and time for the phantom of FIG. 5(a)
FIG. 5(e) is a USF image on the XY plane using the raster scan of the phantom of FIG. 5(a)
FIG. 5(f) is a USF image on the XY plane using a Z-scan of the phantom of FIG. 5(a)

FIG. 5(a) shows a white-light photo of the porcine tongue phantom. Because the porcine tongue tissue was relatively dense compared with other available porcine muscle tissues, the contrast agents were less diffused after a local injection. The USF contrast agent (30 μl, ICG-NPs) with a LCST of ~24-25° C. mixed with the commercial CT contrast agent (10 μL ExiTron™ nano 12000, Miltenyi Biotec, Bergisch Gladbach, Germany) was locally injected into the phantom with a thickness of 1.3 cm to form a single spot. FIG. 5(b) shows the 2D and normalized fluorescence intensity distribution on the tissue top surface. The box indicates the horizontal scan plane (XY) of the USF imaging. To avoid optical cross-talk, the separation distance between the two adjacent scan points in the Z-scan mode, such as the distance between the point #1 and #2, is examined. Specifically, the USF signal pattern's change in space and time at a scan point was investigated. An ultrasound pulse with 60 mV driving voltage and 400 ms duration was applied on the position indicated by the white spot in FIG. 5(b). The depth of this scan position was 7.62 mm from the bottom of the phantom. It took 615.82 ms (500 ms exposure time and 115.82 ms readout time) to record a single fluorescence image. A total of 60 frames was recorded (3 frames before ultrasound exposure and 57 frames after ultrasound exposure). The background image was obtained by averaging the three frames before ultrasound exposure. Thus, the dynamic pattern of USF signal was obtained from the fourth frame to the last one. To analyze these data, as one example, the spatial distribution of USF photons on the fifth frame (after being subtracted by the averaged background image) is shown in FIG. 5(c). A white bar is drawn on the image. One end of the white bar is located at the center of the pattern, which indicates the location of the HIFU focus (i.e. heating position). The other end of the bar is far away from the center and well beyond the HIFU heating zone. By extracting the data along this white bar at all the different time points, FIG. 5(d) shows a 2D representation of the HIFU-induced USF photons in space and time. The origin of this image indicates the position where was illuminated by the ultrasound. The USF photons near the heating center decays slowly, which is why the time interval between two adjacent scan positions in the raster scan mode is long and the imaging speed is low. On the other hand, the USF photons are very weak at the location 4 mm away from the heating center after 5 s. Thus, if the next scan location is positioned at 4 mm away from the previous scan location and the HIFU starts exposure 5 s after the previous exposure, the interference (i.e. cross-talk) of USF photons between these two temporally adjacent scan locations can be avoided. It is also true if the separation distance between two scan points can be increased to 5 mm or above, the waiting time can be avoided. FIGS. 5(e) and (f) show the 2D USF images on the XY plane at Z=7.62 mm using the raster scan and Z-scan, respectively. The patterns of these two images were similar, but the imaging speed of the Z-scan was four times faster than that of the raster scan.

C. USF Imaging of Contrast Agent Distribution in a Tissue Phantom

Figure 6:
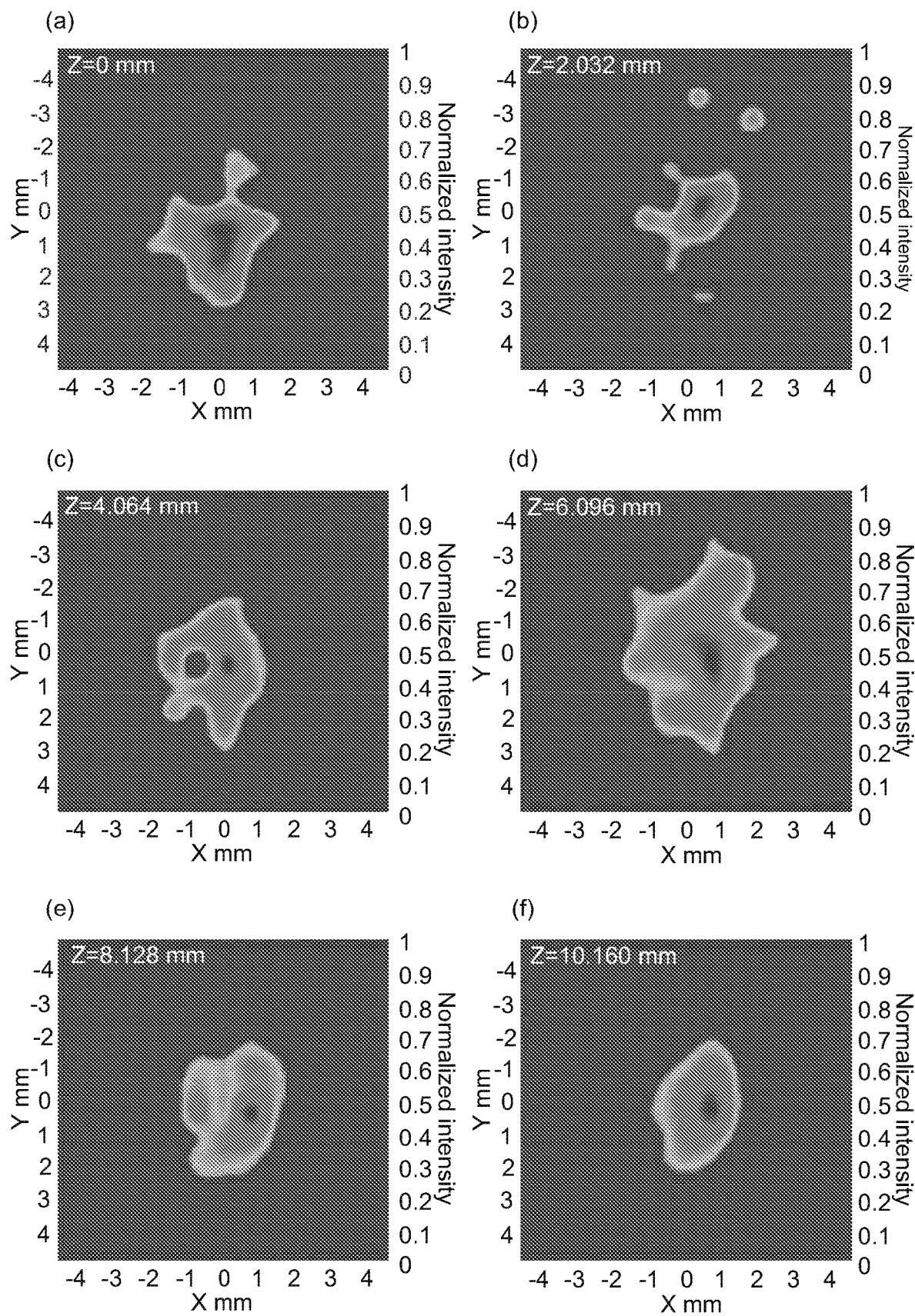
FIGS. 6(a)-6(f) are 2D USF images of the contrast agent distribution on the XY plane at different depths (i.e. Z direction)

To obtain the 3D contrast agent distribution in the tissue phantom shown in FIG. 5(a), a volume of 9.906×9.906×10.16 mm$^3$ was scanned by the HIFU transducer with a driving voltage of 60 mV using the Z-scan method. The lateral step size was 0.762 mm and axial step size was 2.032 mm. After the USF imaging, the tissue phantom was scanned by a commercial micro-CT system (Skyscan 1178, Bruker, Kontich, Belgium). FIG. 6 shows the 2D USF images of the contrast agent distribution on the XY plane at different depths (i.e. Z direction). Due to the excitation light and the emitted fluorescence would be attenuated with the depth of the tissue, the intensity of the USF signals from different layers were not comparable. Thus, the signal intensity had been normalized at each layer. The pixel size of these USF images had been interpolated to 50.8 μm and the target (i.e. contrast agent distribution at that depth) had been differentiated from the background via two-dimensional Otsu method (J. Z. Liu and W. Q. Li, "The automatic thresholding of gray-level pictures via two-dimensional otsu method" (in Chinese), Acta Automat. Sinica, vol. 19, pp. 101-105, 1993).

By combining all the 2D USF images together, a 3D USF image was obtained. The 2D X-ray projections were reconstructed into a 3D CT image via the software provided by the manufacturer of the micro-CT system (NRecon). Since the exact scan area of the USF imaging was known, the 3D CT image of the contrast agent distribution could be extracted from the reconstructed CT image via the software provided by the manufacturer (CTAn). The 3D USF image and the 3D CT image were co-registered in the software provided by the manufacturer (DataViewer). The co-registration was realized by slightly moving and rotating the USF image compared to the CT image which might not be absolutely accurate since there were no markers could be detected by the two modalities. The visualization of the 3D images was realized via ParaView (Sandia National Laboratory, Kitware Inc, Los Alamos National Laboratory).

Figure 7:
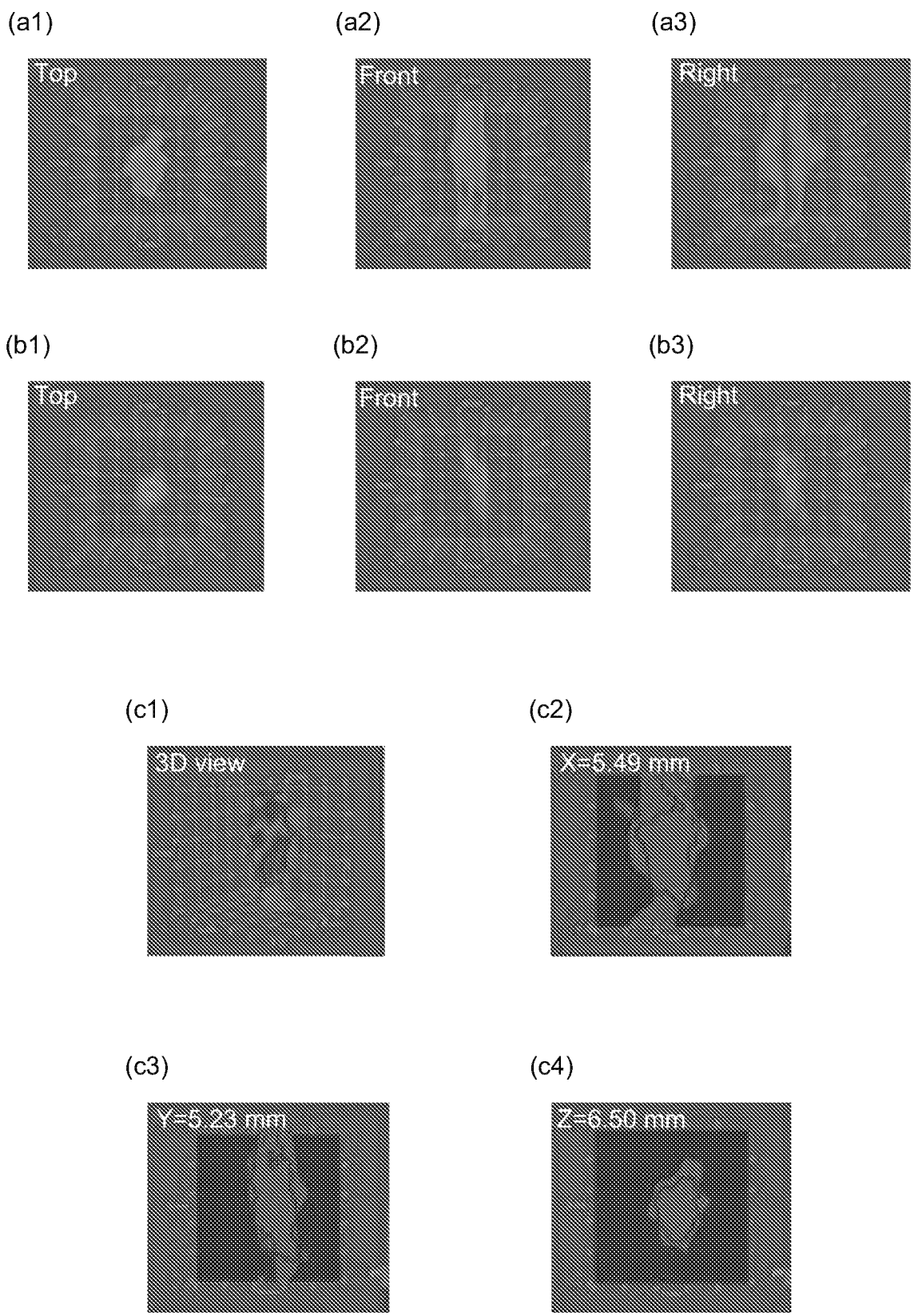
FIGS. 7(a1)-7(a3) are a top view (XY), front view (XZ) and right view (YZ) of 3D USF images, respectively.

FIG. 7($a1$-$a3$) show the top view (XY), front view (XZ) and right view (YZ) of the 3D USF images of the USF contrast agent distribution, respectively. FIG. 7($b1$-$b3$) show the top view (XY), front view (XZ) and right view (YZ) of the 3D CT images of the CT contrast agent distribution, respectively. FIG. 7($c1$) shows the 3D co-registered USF and CT images and FIG. 6($c2$-$c4$) are the corresponding cross-section images on different planes. In the 3D view image, i.e. FIG. 7($c1$), the common volume accounts for 48.04% of the total volume of the USF image and 72.49% of the total volume of the CT image, respectively. On the YZ plane at X=5.49 mm, i.e. FIG. 7($c2$), the common area accounts for 54.32% of the USF image area and 88.65% of the CT image area. On the XZ plane at Y=5.23 mm, i.e. FIG. 7($c3$), the common area accounts for 68.30% of the USF image area and 88.58% of the CT image area. On the XY plane at Z=6.50 mm, i.e. FIG. 7($c4$), the common area accounts for 58.26% of the USF image area and 100% of the CT image area.

Figure 8:
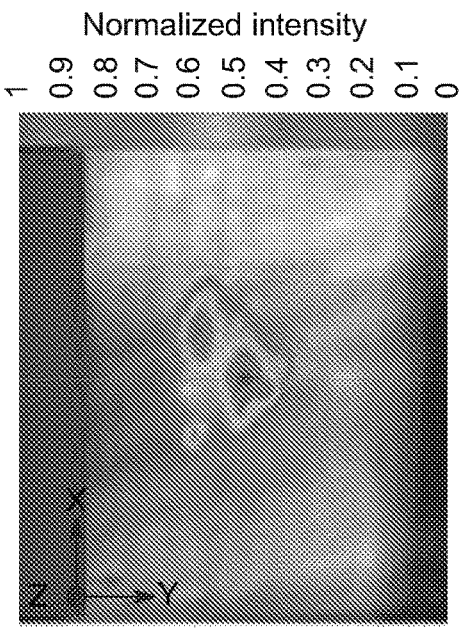
FIG. 8(a) is a white-light photo of the porcine tongue phantom.
FIG. 8(b) is fluorescence image of the mixed contrast agent distribution in the phantom of FIG. 8(a) and the square indicates the scan area of the USF imaging on the horizontal (XY) plane.
FIGS. 8(c)-8(h) are 2D USF images on XY plane at different depths of the phantom of FIG. 8(b)
Figure 8:
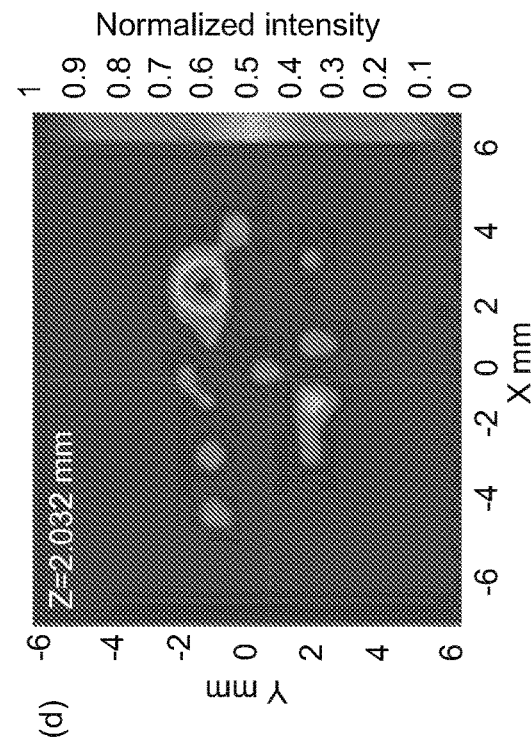
Figure 8:
Figure 8:
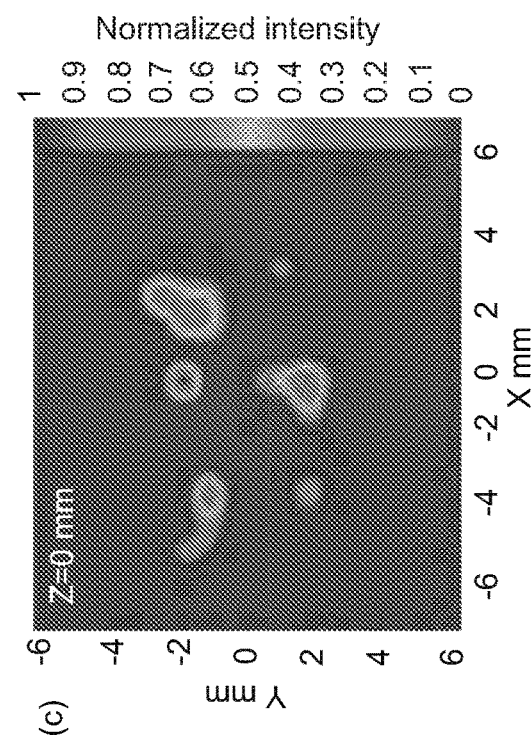
Figure 8:
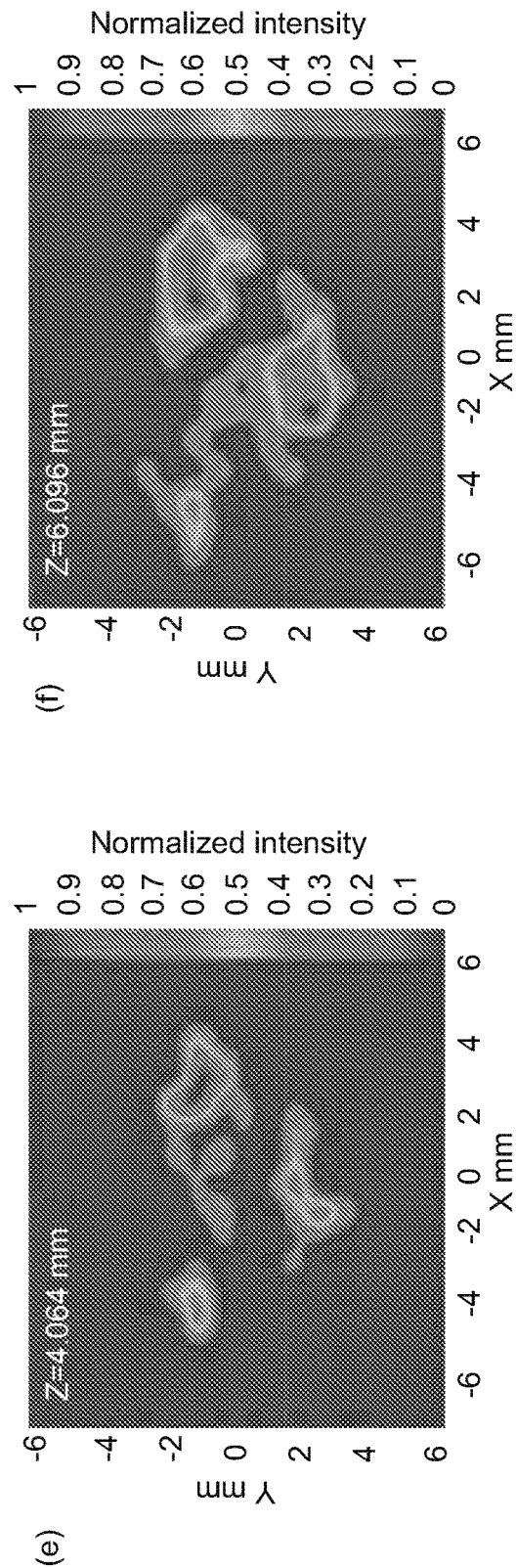
Figure 8:
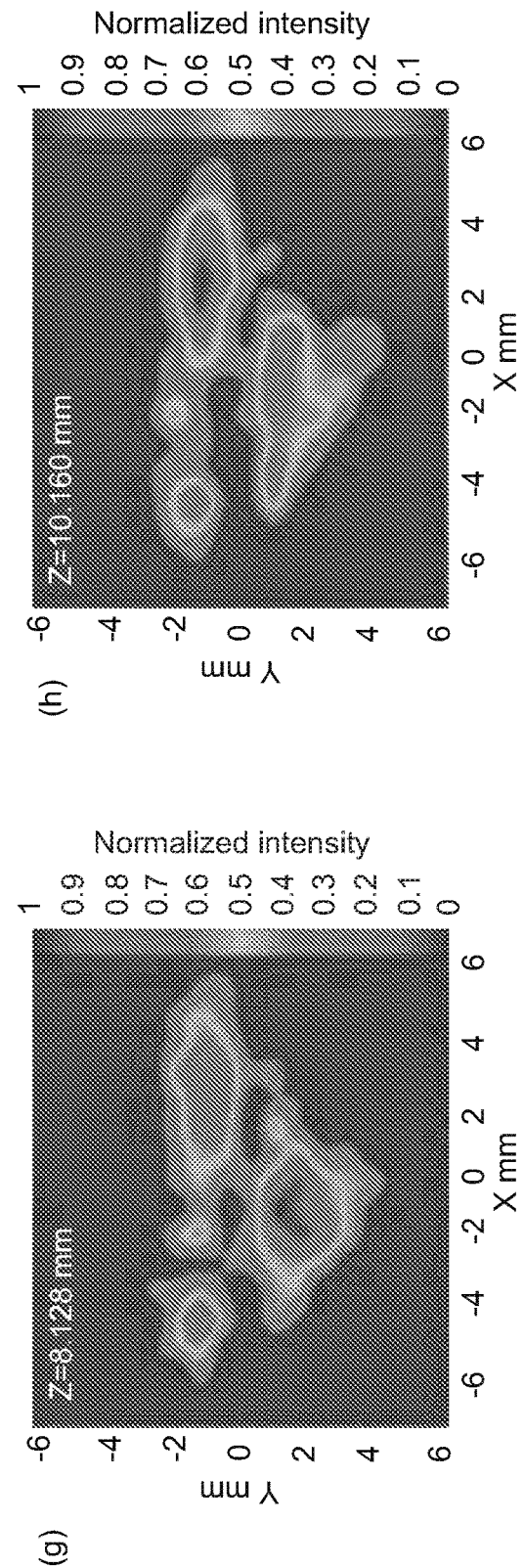

To investigate the capability of the USF imaging with a more complicated contrast agent distribution pattern, as shown in FIG. 8($a$), 45 μL USF contrast agent mixed with 15 μL CT contrast agent was locally injected into a porcine tongue phantom with a thickness of 1.3 cm at three different locations to form three spots (20 μL each). FIG. 8($b$) shows the 2D and normalized fluorescence intensity distribution on the tissue top surface. The box indicates the scan area of the USF imaging on the horizontal plane. A volume of 12.954× 12.954×10.16 mm$^3$ was scanned by the HIFU transducer with a driving voltage of 60 mV using the Z-scan method. The lateral step size was 0.762 mm and axial step size was 2.032 mm. FIG. 8($c$-$h$) show the 2D USF images of the contrast agent distribution on the XY plane at different depths. The three spots can be seen clearly in these USF images at some depths while are not observable in the regular fluorescence image (i.e. FIG. 8($b$)) that is the only image acquired on the tissue surface.

Figure 9:
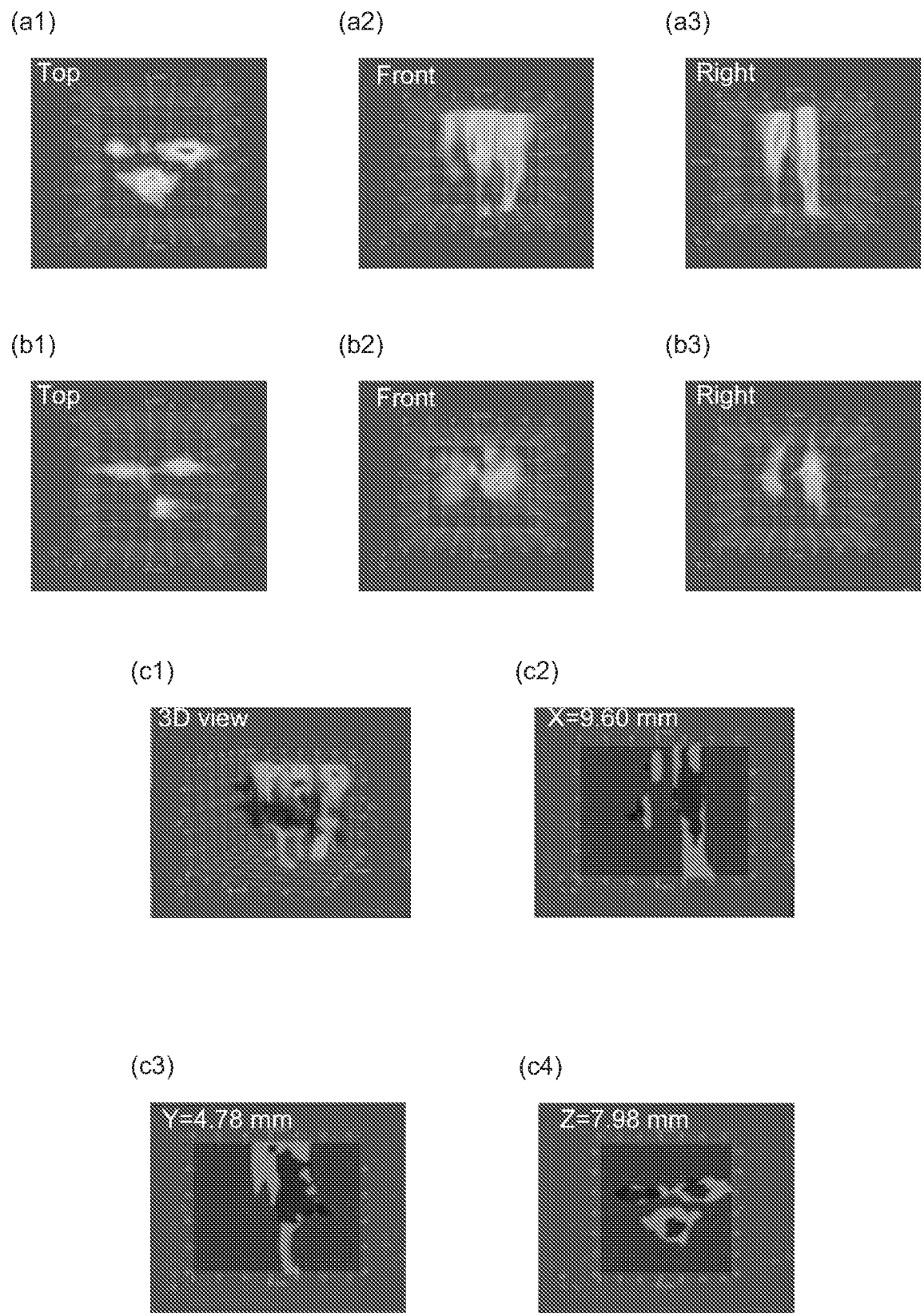
FIGS. 9(a1)-9(a3) are a top view (XY), front view (XZ) and right view (YZ) of the 3D USF images of USF contrast agent distribution, respectively.

FIGS. 9($a1$-$a3$) show the top view (XY), front view (XZ) and right view (YZ) of the 3D USF images of the USF contrast agent distribution, respectively. FIGS. 9($b1$-$b3$) show the top view (XY), front view (XZ) and right view (YZ) of the 3D CT images of the CT contrast agent distribution, respectively. FIG. 9($c1$) shows the 3D co-registered USF and CT images and FIGS. 9($c2$-$c4$) are the corresponding cross-section images on different planes. In the 3D view image, i.e. FIG. 9($c1$), the common volume accounts for 32.16% of the total volume of the USF image and 54.40% of the total volume of the CT image, respectively. On the YZ plane at X=9.60 mm, i.e. FIG. 9($c2$), the common area accounts for 42.93% of the USF image area and 90.40% of the CT image area. On the XZ plane at Y=4.78 mm, i.e. FIG. 9($c3$), the common area accounts for 45.91% of the USF image area and 94.14% of the CT image area. On the XY plane at Z=7.98 mm, i.e. FIG. 9($c4$), the common area accounts for 32.58% of the USF image area and 80.86% of the CT image area.

The invention claimed is:

1. A method of imaging comprising:
   (a) disposing a population of ultrasound-switchable fluorophores within an environment, the environment having an exterior surface and the population of ultrasound-switchable fluorophores having a switching threshold temperature;
   (b) exposing the environment to an ultrasound beam to create a first activation region within the environment, the first activation region having a temperature greater than or equal to the switching threshold temperature;
   (c) disposing the population of fluorophores within the first activation region to switch at least one fluorophore of the population from an off state to an on state;
   (d) exposing the environment to a beam of electromagnetic radiation, thereby exciting at least one fluorophore in the on state within the first activation region;
   (e) detecting a first photoluminescence signal emitted by the excited fluorophore at a first optical spot on the exterior surface of the environment, the first optical spot corresponding to the first activation region within the environment;
   (f) subsequently exposing the environment to the ultrasound beam to create a second activation region within the environment, the second activation region having a temperature greater than or equal to the switching threshold temperature;
   (g) disposing the population of fluorophores within the second activation region to switch at least one fluorophore of the population from an off state to an on state;
   (h) exposing the environment to a beam of electromagnetic radiation, thereby exciting at least one fluorophore in the on state within the second activation region; and
   (i) detecting a second photoluminescence signal emitted by the excited fluorophore within the second activation region at a second optical spot on the exterior surface of the environment, the second optical spot corresponding to the second activation region within the environment,
   wherein the first optical spot and the second optical spot are optically resolvable spatially on the exterior surface of the environment;
   ($f_n$) subsequently and sequentially exposing the environment to the ultrasound beam to create n additional activation regions within the environment, the n additional activation regions having a temperature greater than or equal to the switching threshold temperature;
   ($g_n$) disposing the population of fluorophores within the n additional activation regions to switch at least one fluorophore of the population from an off state to an on state;
   ($h_n$) sequentially exposing the environment to a beam of electromagnetic radiation an additional n times, thereby sequentially exciting at least one fluorophore in the on state within the n additional activation regions; and ($i_n$) sequentially detecting n additional photoluminescence signals emitted by the excited fluorophore within the n additional activation regions at n additional optical spots on the exterior surface of the environment, the n additional optical spots corresponding, respectively and sequentially, to the n additional activation regions within the environment, wherein n is an integer between 1 and 1000, and wherein each subsequent optical spot is optically resolvable spatially on the exterior surface of the environment from the immediately preceding optical spot.

2. The method of claim 1, wherein each subsequent optical spot is optically resolvable spatially on the exterior surface of the environment from all other preceding optical spots.

3. The method of claim 1, wherein the first photoluminescence signal and the second photoluminescence signal are directly detected using a camera.

4. The method of claim 3, wherein the first optical spot and the second optical spot are simultaneously within the field of view of the camera.

5. The method of claim 3, wherein the camera is stationary relative to the exterior surface of the environment.

6. The method of claim 1, wherein the environment is a biological compartment.

7. A method of imaging comprising:
(a) disposing a population of ultrasound-switchable fluorophores within an environment, the environment having an exterior surface and the population of ultrasound-switchable fluorophores having a switching threshold temperature;
(b) exposing the environment to a plurality of ultrasound beams simultaneously to create a plurality of first activation regions within the environment, the plurality of first activation regions having a temperature greater than or equal to the switching threshold temperature;
(c) disposing the population of fluorophores within the plurality of first activation regions to switch a plurality of fluorophores of the population from an off state to an on state;
(d) exposing the environment to a beam of electromagnetic radiation, thereby exciting the plurality of fluorophores in the on state within the plurality of first activation regions; and
(e) detecting a plurality of first photoluminescence signals emitted by the plurality of excited fluorophores at a plurality of first optical spots on the exterior surface of the environment, the plurality of first optical spots corresponding to the plurality of first activation regions within the environment,
wherein the plurality of first activation regions are formed simultaneously, and
wherein the plurality of first optical spots are optically resolvable spatially from one another on the exterior surface of the environment.

8. The method of claim 7, wherein the plurality of first activation regions are formed simultaneously using a single ultrasound transducer.

9. The method of claim 7, wherein the plurality of first photoluminescence signals are directly detected using a camera.

10. The method of claim 9, wherein the plurality of first photoluminescence signals are simultaneously within the field of view of the camera.

11. The method of claim 9, wherein the camera is stationary relative to the exterior surface of the environment.

12. The method of claim 7 further comprising:
(f) subsequently exposing the environment to the plurality of ultrasound beams to create a plurality of second activation regions within the environment, the plurality of second activation regions having a temperature greater than or equal to the switching threshold temperature;
(g) disposing the population of fluorophores within the plurality of second activation regions to switch a plurality of fluorophores of the population from an off state to an on state;
(h) exposing the environment to a beam of electromagnetic radiation, thereby exciting the plurality of fluorophores in the on state within the plurality of second activation regions; and
(i) detecting a plurality of second photoluminescence signals emitted by the plurality of excited fluorophores at a plurality of second optical spots on the exterior surface of the environment, the plurality of second optical spots corresponding to the plurality of second activation regions within the environment,
wherein the plurality of second activation regions are formed simultaneously;
wherein the plurality of second optical spots are optically resolvable spatially from one another on the exterior surface of the environment; and
wherein the plurality of second optical spots are optically resolvable spatially from the plurality of first optical spots on the exterior surface of the environment.

13. The method of claim 12, wherein the plurality of second activation regions are created within the environment and the plurality of second photoluminescence signals are detected on the exterior surface before the plurality of first activation regions have cooled below the switching threshold temperature.

14. The method of claim 12 further comprising:
($f_n$) subsequently and sequentially exposing the environment to the plurality of ultrasound beams to create n additional pluralities of additional activation regions within the environment, the additional activation regions having a temperature greater than or equal to the switching threshold temperature;
($g_n$) disposing the population of fluorophores within the additional activation regions to switch a plurality of fluorophores of the population from an off state to an on state;
($h_n$) sequentially exposing the environment to a beam of electromagnetic radiation an additional n times, thereby sequentially exciting the plurality of fluorophores in the on state within the additional activation regions; and
($i_n$) sequentially detecting n additional pluralities of additional photoluminescence signals emitted by the excited fluorophores within the additional activation regions at n additional pluralities of additional optical spots on the exterior surface of the environment, the additional optical spots corresponding, respectively and sequentially, to the additional activation regions within the environment,
wherein n is an integer between 1 and 1000, and
wherein each subsequent plurality of additional optical spots is optically resolvable spatially on the exterior surface of the environment from the immediately preceding plurality of additional optical spots.

15. The method of claim 14, wherein each subsequent plurality of additional optical spots is optically resolvable spatially on the exterior surface of the environment from all other preceding pluralities of additional optical spots.

16. The method of claim 7, wherein the environment is a biological compartment.

17. The method of claim 1, wherein the second activation region is created within the environment and the second photoluminescence signal is detected on the exterior surface before the first activation region has cooled below the switching threshold temperature.

* * * * *